US00RE42185E

(19) United States
(12) Reissued Patent
Sekiguchi et al.

(10) Patent Number: US RE42,185 E
(45) Date of Reissued Patent: Mar. 1, 2011

(54) IMAGE RETRIEVAL SYSTEM AND IMAGE RETRIEVAL METHOD

(75) Inventors: Shunichi Sekiguchi, Tokyo (JP); Yoshimi Isu, Tokyo (JP); Hirofumi Nishikawa, Tokyo (JP); Yoshihisa Yamada, Tokyo (JP); Kohtaro Asai, Tokyo (JP)

(73) Assignee: Mitsubishi Denki Kabushiki Kaisha, Tokyo (JP)

(21) Appl. No.: 11/300,693

(22) Filed: Dec. 15, 2005

Related U.S. Patent Documents

Reissue of:
(64) Patent No.: 6,665,442
Issued: Dec. 16, 2003
Appl. No.: 09/773,570
Filed: Feb. 2, 2001

U.S. Applications:
(63) Continuation of application No. PCT/JP00/08547, filed on Dec. 1, 2000.

(30) Foreign Application Priority Data

Dec. 2, 1999 (JP) ..... 11-343256

(51) Int. Cl.
*G06K 9/62* (2006.01)

(52) U.S. Cl. ..... 382/224; 382/190; 382/195; 382/232; 382/305

(58) Field of Classification Search ..... 382/232, 382/224, 217, 305, 236, 190; 348/231.99; 707/104.1, 3, 6, 2, 100, 102
See application file for complete search history.

(56) References Cited

U.S. PATENT DOCUMENTS 5,465,353 A 11/1995 Hull et al.
5,819,286 A 10/1998 Yang et al.
6,502,105 B1 * 12/2002 Yan et al. ..... 707/104.1
6,792,043 B1 * 9/2004 Takahashi et al. ..... 375/240.01
7,006,714 B2 * 2/2006 Kasutani ..... 382/305
2002/0105541 A1 * 8/2002 Endou et al. ..... 345/738

FOREIGN PATENT DOCUMENTS

EP 0878767 A 11/1998
GB 0872803 A1 10/1998
JP 2-219391 A 8/1990

(Continued)

OTHER PUBLICATIONS

Sung et al., "Iconic pictorial retrieval using multiple attributes, " Systems, Man, and Cybernetics, 1998, 1998 IEEE International Conference, San Diego, CA, USA,, Oct. 11, 14, 1998, New York, NY, USA, IEEE, US, vol. 5, pp. 4589–4594, Oct. 11, 1998, XP010311152.

(Continued)

*Primary Examiner*—Samir A Ahmed
*Assistant Examiner*—Ali Bayat
(74) *Attorney, Agent, or Firm*—Birch, Stewart, Kolasch & Birch, LLP.

(57) ABSTRACT

When a retrieval condition of an attribute list is input from a user interface unit to a retrieval processing unit, the attribute list stored in an attribute list storing unit is retrieved in the retrieval processing unit. Thereafter, attribute information conforming to the retrieval condition is output to and displayed on a displaying unit. Thereafter, when a retrieval condition of the similarity retrieval is input from the user interface unit to the retrieval processing unit, image data stored in the image information storing unit is retrieved in the retrieval processing unit, and specific image data relating to a characteristic descriptor set conforming to the retrieval condition is selected in the retrieval processing unit. Thereafter, the specific image data is output to and displayed on the displaying unit.

28 Claims, 17 Drawing Sheets

FOREIGN PATENT DOCUMENTS

| | | | |
|---|---|---|---|
| JP | 3-270388 | A | 12/1991 |
| JP | 6168277 | | 6/1994 |
| JP | 9-270006 | A | 10/1997 |
| JP | 09282324 | | 10/1997 |
| JP | 10091634 | | 4/1998 |
| JP | 10124655 | | 5/1998 |
| JP | 10-320400 | A | 12/1998 |
| JP | 11224266 | | 8/1999 |
| TW | 84112558 | | 11/1995 |
| TW | 85104458 | | 4/1996 |
| TW | 85112595 | | 10/1996 |
| WO | WO-98/21688 | A | 5/1998 |

OTHER PUBLICATIONS

Jau–Yuen Chen et al., "ViBE: a new paradigm for video database browsing and search, " Content–Based Access of Image and Video Libraries, 1998, Proceedings, IEEE Workshop on Santa Barbara, CA, USA, Jun. 21, 1998, Los Alamitos, CA, USA, IEEE Comput. Soc., US, 1998, pp. 96–100, XP010293858.

Hatano, Kenji, New Generation Database Technology, Authoring and Retrieval of Video Scenes by Multi–level Self–organizing Maps, Transactions of the Institute of Information Processing Society of Japan, Apr. 15, 1998, vol. 39, No. 4, pp. 933–942.

Shibata, Masahiro, Temporal Video Segmentation for Scene Description, Transactions of the Institute of Electronics, Information and Communication Engineers, Apr. 25, 1999, vol. J82–D–11, No. 4, pp. 732–742.

Yoshimi Isu et al., "XML Kijutsu wo mochiiru Contents Kensaku Jikken System no Kouchiku", Proceedings of Information System Society Meeting in 1999, the Institute of Electronics, Information and Communication Engineers (Sep. 7, 1999), p. 132, Fig. 1.

"Synthesis and Evalution of the Image Database with Fully Automated Keyword Extraction by State Transition Model and Scene Description Language", *Institute of Electronic Information and Communication Engineers of Japan*, D–II vol. J79–D–11 No. 4, pp. 476–483, Apr. 1996.

"A critical evaluation of mage and video indexing techniques in the compressed domain", M.K. Mandal et al., *Image Vision Computing*, 17, 513–529, 1999.

Ono et al., IEICE, D–II vol. J79, No. 4, pp. 476–483 (1996) w/partial English Translation.

* cited by examiner

FIG.4

From:Yoshimi
Date:Wed, 18 Aug 1999 10:16:55+0900
Subject:Meeting

TEXT INFORMATION EXTRACTED FROM VIDEO DATA

DESCRIPTION IN XML LANGUAGE

```
<!Element TextInfo(Category, Author, Date, Time, Title, Locator)>
<!Element Category(#PCDATA)>
<!Element Author(#PCDATA)>
<!Element Date(#PCDATA)>
<!Element Time(#PCDATA)>
<!Element Title(#PCDATA)>
<!Element Locator(#PCDATA)>
```

DEFINITION FILE FOR DESCRIBING TEXT INFORMATION (TEXT INFORMATION DESCRIPTION DATA CLASS) (DTD)

```
<TextInfo>
  <Category>
  Video Mail
  </Category>
  <Author>
  Yoshimi
  </Author>
  <Date>
  1999.8.18
  </Date>
  <Time>
  10:16
  </Time>
  <Title>
  Meeting
  </Title>
  <Locator>
  A¥VideoMail¥Shun¥meeting.mpeg
  </Locator>
</TextInfo>
```

INSTANCE OF TEXT INFORMATION (XML DOCUMENT)

SHORT RUN

MIDDLE RUN

| | | | | | | | | | | |
|---|---|---|---|---|---|---|---|---|---|---|
| 6 | 0 | 0 | 5 | 1 | 0 | 0 | 0 | 0 | 0 | 0 |
| 4 | 0 | 2 | 5 | 0 | 0 | 0 | 0 | 0 | 0 | 0 |
| 4 | 3 | 2 | 3 | 0 | 0 | 0 | 0 | 0 | 0 | 0 |
| 0 | 3 | 3 | 5 | 1 | 0 | 0 | 0 | 0 | 0 | 0 |
| 0 | 0 | 0 | 5 | 5 | 0 | 0 | 0 | 0 | 0 | 0 |
| 0 | 0 | 0 | 3 | 1 | 5 | 0 | 0 | 0 | 0 | 0 |
| 0 | 0 | 0 | 2 | 4 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

LONG RUN

FIG.10

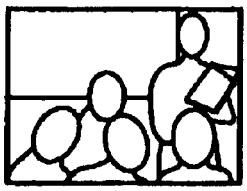

CHARACTERISTIC VALUE SET EXTRACTED FROM VIDEO BIT STREAM

```
<MediaInfo>
  <Format>
  MPEG-1
  </Format>
  <Medium>
  CD
  </Medium>
  ...
  <Locator>
  A:¥VideoMail¥Shun¥meeting. mpeg
  </Locator>
</MediaInfo>
<MotionInfo>
  <Average>
  10.5
  </Average>
  ...
</MotionInfo>
<ColourTexture>
<YDC>
<Average>
47.5
</Average>
<Average>
50.2
</Average>
...
<Std>
55
</Std>
...
</YDC>
<UDC>
...
</UDC>
<VDC>
...
</VDC>
</Colour Texture>
```

CHARACTERISTIC DESCRIPTOR SET (XML DOCUMENT)

```
<!Element MediaInfo(Format, Medium, ···Locator)>
<!Element Format(#PCDATA)>
<!Element Medium(#PCDATA)>
...
<!Element Locator(#PCDATA)>
<!Element MotionInfo(Average, ShortRun,MediumRun, LongRun)>
...
<!Element ColourTexture(YDC, UDC, VDC)>
<!Element YDC(Average*, Std*)>
<!Element CuDC(Average*, Std*)>
<!Element CrDC(Average*, Std*)>
```

DEFINITION FILE FOR DESCRIBING CHARACTERISTIC VALUES (CHARACTERISTIC VALUE DESCRIPTION DATA CLASS) (DTD)

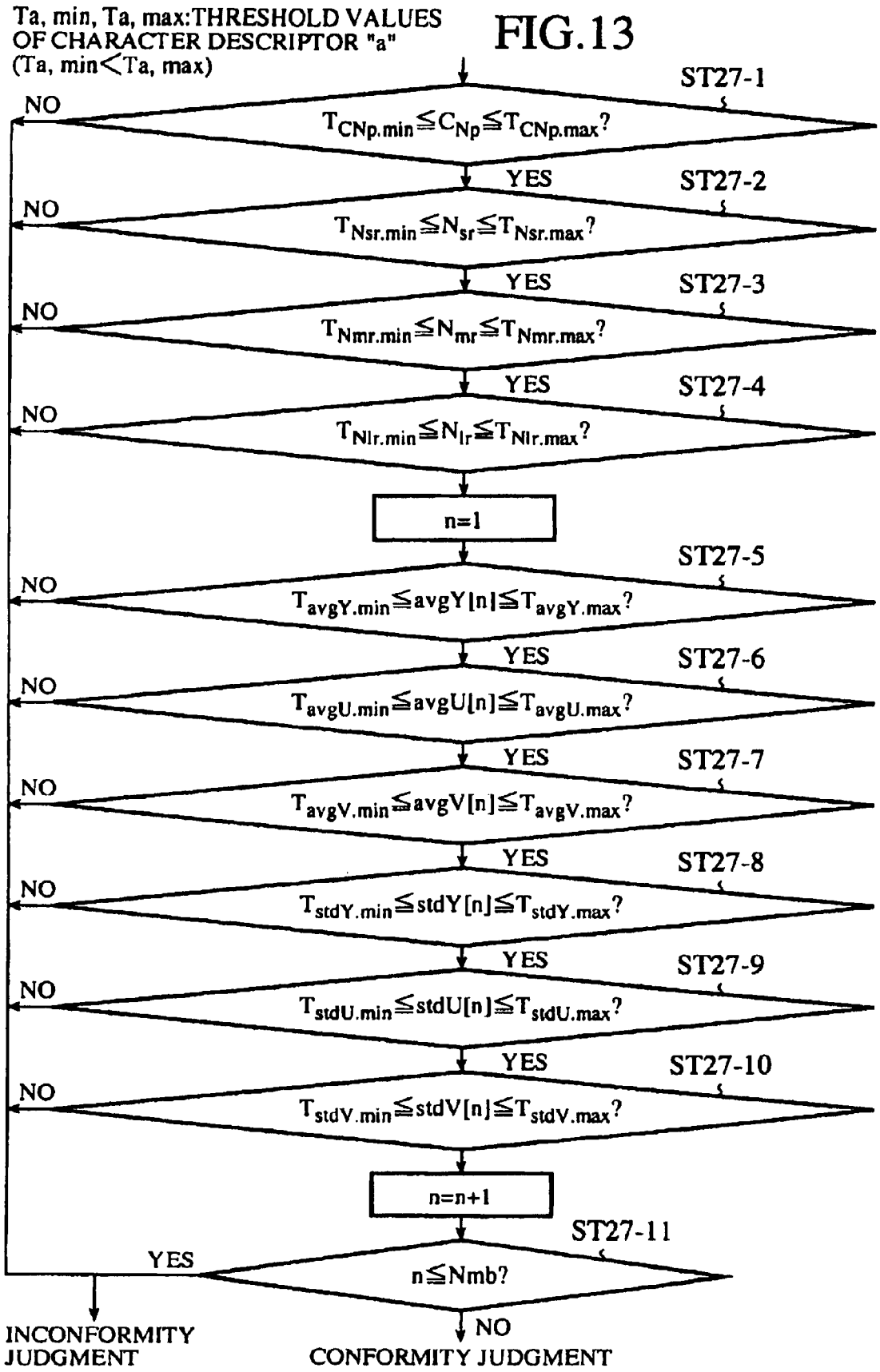
Ta, min, Ta, max:THRESHOLD VALUES OF CHARACTER DESCRIPTOR "a"
(Ta, min<Ta, max)
FIG.13
ST27-1
$T_{CNp.min} \leqq C_{Np} \leqq T_{CNp.max}$?
NO
YES
ST27-2
$T_{Nsr.min} \leqq N_{sr} \leqq T_{Nsr.max}$?
NO
YES
ST27-3
$T_{Nmr.min} \leqq N_{mr} \leqq T_{Nmr.max}$?
NO
YES
ST27-4
$T_{Nlr.min} \leqq N_{lr} \leqq T_{Nlr.max}$?
NO
n=1
ST27-5
$T_{avgY.min} \leqq avgY[n] \leqq T_{avgY.max}$?
NO
YES
ST27-6
$T_{avgU.min} \leqq avgU[n] \leqq T_{avgU.max}$?
NO
YES
ST27-7
$T_{avgV.min} \leqq avgV[n] \leqq T_{avgV.max}$?
NO
YES
ST27-8
$T_{stdY.min} \leqq stdY[n] \leqq T_{stdY.max}$?
NO
YES
ST27-9
$T_{stdU.min} \leqq stdU[n] \leqq T_{stdU.max}$?
NO
YES
ST27-10
$T_{stdV.min} \leqq stdV[n] \leqq T_{stdV.max}$?
NO
n=n+1
ST27-11
$n \leqq Nmb$?
YES
NO
INCONFORMITY JUDGMENT
CONFORMITY JUDGMENT

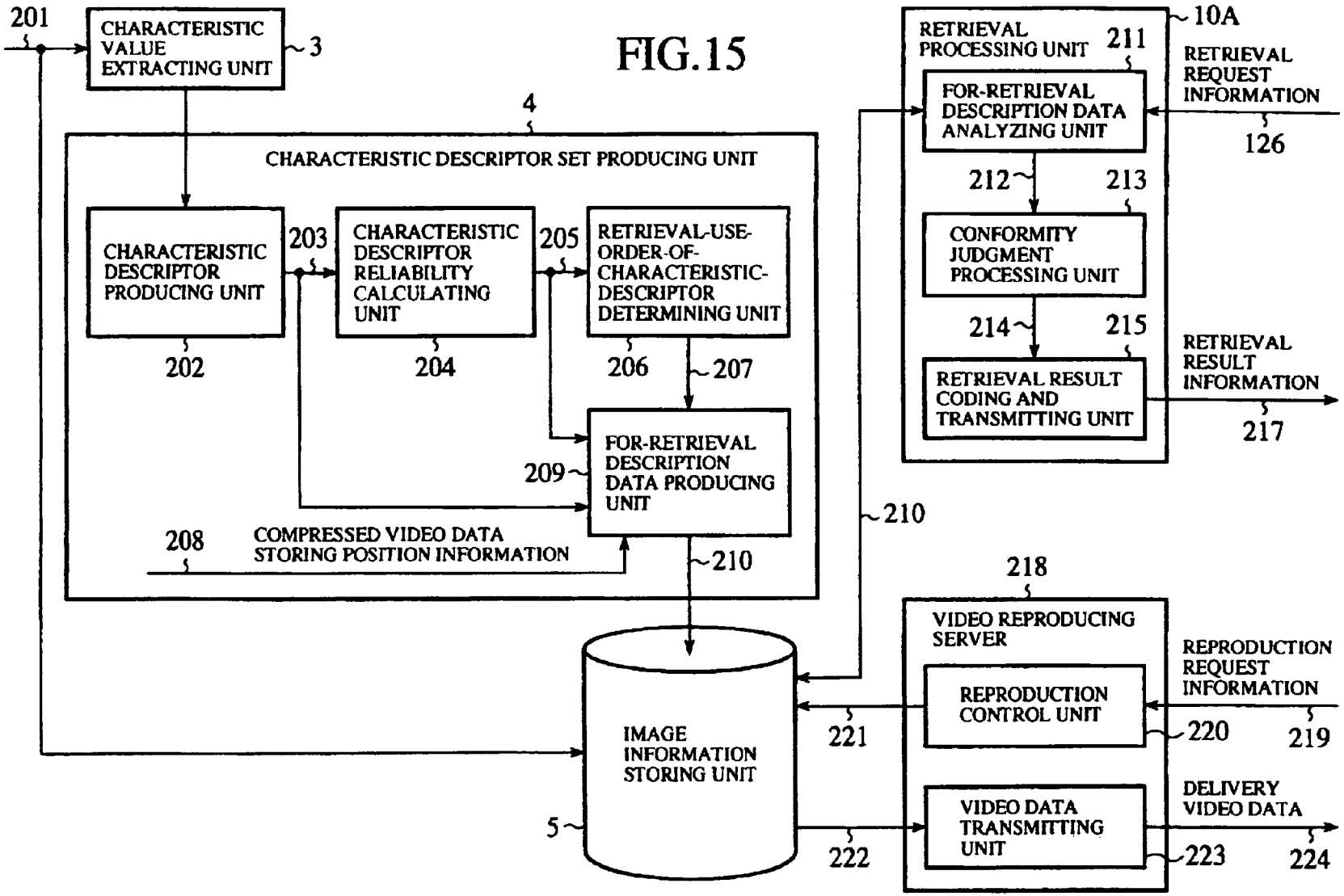
10A
RETRIEVAL REQUEST INFORMATION
126
RETRIEVAL RESULT INFORMATION
217
RETRIEVAL PROCESSING UNIT
211
FOR-RETRIEVAL DESCRIPTION DATA ANALYZING UNIT
212
213
CONFORMITY JUDGMENT PROCESSING UNIT
214
215
RETRIEVAL RESULT CODING AND TRANSMITTING UNIT
210
REPRODUCTION REQUEST INFORMATION
219
220
DELIVERY VIDEO DATA
224
223
218
VIDEO REPRODUCING SERVER
REPRODUCTION CONTROL UNIT
VIDEO DATA TRANSMITTING UNIT
221
222
FIG.15
4
CHARACTERISTIC DESCRIPTOR SET PRODUCING UNIT
RETRIEVAL-USE-ORDER-OF-CHARACTERISTIC-DESCRIPTOR DETERMINING UNIT
206
207
FOR-RETRIEVAL DESCRIPTION DATA PRODUCING UNIT
209
210
205
CHARACTERISTIC DESCRIPTOR RELIABILITY CALCULATING UNIT
204
203
CHARACTERISTIC DESCRIPTOR PRODUCING UNIT
202
COMPRESSED VIDEO DATA STORING POSITION INFORMATION
208
IMAGE INFORMATION STORING UNIT
5
3
CHARACTERISTIC VALUE EXTRACTING UNIT
201

FIG.20

| SUBJECTIVE MEANING | CHARACTERISTIC DESCRIPTORS | | | | |
|---|---|---|---|---|---|
| | MAGNITUDE OF MOTION | MOTION DIRECTION | MOTION DISTRIBUTION | BRIGHTNESS | REPRESENTATIVE COLOR |
| CHARACTERISTICS IN MAGNITUDE OF MOTION ARE SIMILAR | ○ | | | | |
| MOTION DIRECTION IS SIMILAR | | ○ | | | |
| CHARACTERISTICS OF MOTION DISTRIBUTION IN SCREEN ARE SIMILAR | | | ○ | | |
| AVERAGE BRIGHTNESS IN VIDEO IMAGE IS SIMILAR | | | | ○ | |
| DOMINANT COLOR INFORMATION IN VIDEO IMAGE IS SIMILAR | | | | | ○ |

IMAGE RETRIEVAL SYSTEM AND IMAGE RETRIEVAL METHOD

Matter enclosed in heavy brackets [ ] appears in the original patent but forms no part of this reissue specification; matter printed in italics indicates the additions made by reissue.

*Notice: More then one reissue application has been filed for the reissue of U.S. Pat. No. 6,665,442. The reissue applications are application Ser. No. 11/300,693, and Divisional Reissue application Ser. Nos. 11/932,022, 11/933,358, and 12/603,268 all of which are divisional reissues of U.S. Pat. No. 6,665,442.*

CROSS-REFERENCE TO The RELATED APPLICATION

This application is a continuation of International Application No. PCT/JP00/08547, whose International filing date is Dec. 1, 2000, the disclosures of which Application are incorporated by reference herein.

BACKGROUND OF THE INVENTION

1. Field of the Invention

The present invention relates to an image retrieval system and an image retrieval method in which characteristic values and/or pieces of attribute information are extracted from pieces of image data such as moving images or static images recorded in analog or digital and in which the retrieval of desired image data is performed by using the extracted characteristic values and/or the pieces of extracted attribute information.

2. Description of Related Art

FIG. 1 shows the configuration of a system as an example of a conventional image retrieval processing system. This system is disclosed in a letter "Synthesis and Evaluation of the Image Database with Fully Automated Keyword Extraction by State Transition Model and Scene Description Language" edited by Institute of Electronic Information and Communication Engineers of Japan, D-II Vol. J79-D-II No.4, pp.476–483, April of 1996. In this system, static images are processed in the image retrieval. That is, an area of each of images is divided into a plurality of segments in an area dividing unit 103 of a preparation unit 101, and a plurality of keywords are attached to each divided segment. As the keywords, a conception keyword and a scene description keyword are prepared. In a conception keyword extracting unit 104, a conception keyword 108 of each segment is obtained according to a color and a characteristic value of the segment by using conception keywords respectively allocated to color information in advance. In a scene description keyword describing unit 105, a predicate relating to "position", "color", "shape", "size", "direction" or the like is obtained from a plurality of image characteristic values of segments. In the unit 105, an operation 106, in which a user 107 selects one predicate from predicates defined in advance and describes the selected predicate, is required, and the selected predicate is output as a scene description keyword 109. In a retrieval tool 102, conception keywords and scene description keywords are prepared in advance. A user 111 selects one conception keyword and one scene description keyword as each of keywords 112 from the prepared keywords. In a characteristic identifying unit 110, an identity of characteristic values is checked by comparing each keyword 112 selected by the user 111 with the conception keyword 108 or the scene description keyword 109 attached to each segment of the image, and an image retrieval processing is performed for the image.

However, in the above-described image retrieval processing system, an identity of characteristic values is checked by using keywords such as conception keywords and scene description keywords selected by the user 112 and keywords attached to each image, and an image retrieval processing is performed according to the characteristic values of each image. Therefore, all images are searched according to only the characteristic values of the images, so that it takes a lot of time to retrieve a desired image.

Also, in the above-described image retrieval processing system, a description method or a storing method of each keyword is not considered. Therefore, it is required that a plurality of image servers relate to a plurality of retrieval tools denoting clients in one-to-one correspondence. As a result, a system, in which many users respectively perform the image retrieval through a network while using various retrieval tools, cannot be provided for the users.

Also, because only static images are processed in the image retrieval, it is difficult to retrieve a desired moving image.

SUMMARY OF THE INVENTION

The present invention is provided to solve the above problems, and a main object of the present invention is to provide an image retrieval system and an image retrieval method in which an image retrieval processing can be efficiently performed.

A subordinate object of the present invention is to provide an image retrieval system and an image retrieval method which does not depend on a plurality of image servers distributed in a network by describing and producing a plurality of retrieval keywords according to a common syntax.

Another subordinate object of the present invention is to provide an image retrieval system and an image retrieval method in which the retrieval of a desired moving image can be easily performed by extracting a characteristic value for each video segment, which is composed of a plurality of frames, in place of the extraction of a characteristic value for each frame when a plurality of keywords are extracted from moving images.

An image retrieval system according to the present invention, comprises a characteristic descriptor producing unit for extracting a plurality of image characteristic values from pieces of input image data and producing a characteristic descriptor for each piece of input image data, an image information storing unit for storing the characteristic descriptors produced in the characteristic descriptor producing unit while holding the correspondence of each characteristic descriptor to one piece of input image data, an attribute list producing unit for producing an attribute list according to a piece of attribute information attached to each piece of input image data, and an image retrieving unit for receiving a first retrieval condition relating to attribute information, searching the attribute list produced in the attribute list producing unit for one piece of attribute information conforming to the first retrieval condition, outputting the piece of attribute information conforming to the first retrieval condition, receiving a second retrieval condition relating to a characteristic descriptor, searching the image information storing unit for one piece of image data conforming to the second retrieval condition and outputting the piece of image data conforming to the second retrieval condition.

Therefore, the retrieval can be efficiently performed.

In an image retrieval system according to the present invention, the attribute list is produced according to a syntax, which defines a data structure of the attribute list, in the attribute list producing unit, and the piece of attribute information conforming to the first retrieval condition is retrieved according to the syntax of the attribute list in the image retrieving unit.

Therefore, the retrieval can be efficiently performed in a short time.

In an image retrieval system according to the present invention, the characteristic descriptors are produced according to a syntax, which defines a data structure of each characteristic descriptor, in the characteristic descriptor producing unit, and the piece of image data conforming to the second retrieval condition is retrieved in the image retrieving unit according to the syntax of the characteristic descriptors.

Therefore, the image retrieval not depending on a plurality of image servers distributed in the network can be performed.

In an image retrieval system according to the present invention, one image characteristic value is extracted in the characteristic descriptor producing unit for each frame, and one characteristic descriptor is produced in the characteristic descriptor producing unit for each video segment composed of a group of frames.

Therefore, the retrieval of a moving image can be easily performed.

In an image retrieval system according to the present invention, each piece of input picture data received in the characteristic descriptor producing unit denotes compressed video data which composes one or more intra-frames and one or more inter-frames, both an average value and a standard deviation are produced as one characteristic descriptor of the intra-frames of the video segment in the characteristic descriptor producing unit by extracting an average matrix of pixel values in a prescribed coding area of one intra-frame for each intra-frame of the video segment, calculating a sum of the average matrices of all intra-frames included in the video segment and calculating both the average value of the average matrices and the standard deviation of the average matrices from the sum and the number of intra-frames in the video segment, and one characteristic descriptor of the inter-frames of the video segment is produced in the characteristic descriptor producing unit by extracting a matrix of motion vectors of pixels of the prescribed coding areas of one inter-frame for each inter-frame of the video segment, calculating an average of the motion vectors of each inter-frame of the video segment as a motion vector average, classifying zero run lengths, which are obtained according to a threshold processing for the motion vectors of one inter-frame, into a plurality of classified types of zero run lengths for each inter-frame of the video segment, calculating an average of the motion vector averages and a plurality of classified types of average zero run lengths in the video segment according to the number of inter-frames in the video segment and setting the average of the motion vector averages and the classified types of average zero run lengths as the characteristic descriptor of the inter-frames of the video segment.

Therefore, the retrieval of a moving image can be easily performed.

In an image retrieval system according to the present invention, each piece of input picture data received in the characteristic descriptor producing unit denotes non-compressed video data, the characteristic values are extracted from the pieces of non-compressed video data in the characteristic descriptor producing unit to produce the characteristic descriptors, and the characteristic descriptors and pieces of compressed video data, which are obtained by compressing the pieces of non-compressed video data according to a prescribed video compression method, are stored in the image information storing unit while the correspondence of each characteristic descriptor to one piece of compressed video data is held.

Therefore, the retrieval can be efficiently performed.

In an image retrieval system according to the present invention, a prescribed condition equation stored in advance is read out by the image retrieving unit in cases where the image retrieving unit searches the image information storing unit for the piece of image data conforming to the characteristic descriptor specified by the second retrieval condition to output the piece of image data, and it is judged according to the prescribed condition equation whether or not the piece of image data conforms to the characteristic descriptor specified by the second retrieval condition.

Therefore, the retrieval can be efficiently performed.

In an image retrieval system according to the present invention, each piece of input image data denotes a monitored image recorded by a monitoring camera.

Therefore, a trespasser can be detected.

In an image retrieval system according to the present invention, each piece of input image data denotes an image of a stored video mail.

Therefore, a user can retrieve a desired mail.

In an image retrieval system according to the present invention, each piece of input image data denotes an image of a stored broadcast program.

Therefore, even though a user does not accurately remember program information, the user can retrieve a desired program according to an image impression.

In an image retrieval system according to the present invention, each piece of input image data denotes a video image recorded by a video camera.

Therefore, the image retrieval can be efficiently performed by using the similarity held in the images as a key.

An image retrieval method according to the present invention comprises the steps of extracting a plurality of image characteristic values from pieces of input image data to produce a characteristic descriptor for each piece of input image data, storing the produced characteristic descriptors while holding the correspondence of each characteristic descriptor to one piece of input image data, producing an attribute list according to a piece of attribute information attached to each piece of input image data, receiving a first retrieval condition relating to attribute information, searching the attribute list for one piece of attribute information conforming to the first retrieval condition, outputting the piece of attribute information conforming to the first retrieval condition, receiving a second retrieval condition relating to a characteristic descriptor, searching the pieces of stored image data for one piece of image data conforming to the second retrieval condition while referring to the piece of attribute information conforming to the first retrieval condition, and outputting the piece of image data conforming to the second retrieval condition.

Therefore, the image retrieval can be efficiently performed

An image retrieval system according to the present invention comprises a characteristic descriptor producing unit for extracting a plurality of image characteristic values from pieces of input image data and producing a characteristic descriptor for each piece of input image data, a for-retrieval description data producing unit for describing each characteristic descriptor as a piece of for-retrieval description data while holding the correspondence of the piece of for-retrieval description data to a space-time structure of the pieces of input image data, an image information storing unit for storing each piece of for-retrieval description data with the piece of input image data corresponding to the piece of for-retrieval description data, a first retrieval processing unit, a second retrieval processing unit, and a user interface unit. A retrieval request received from a user through the user interface unit is sent from the second retrieval processing unit to the first retrieval processing unit as retrieval request information, a retrieval result sent from the first retrieval processing unit is received in the second retrieval processing unit, the second retrieval processing unit presents the retrieval result to the user through the user interface unit, the pieces of for-retrieval description data of the pieces of input image data stored in the image information storing unit are analyzed in the first retrieval processing unit according to the retrieval request information sent from the second retrieval processing unit to extract the characteristic descriptors, a conformity judgment processing is performed in the first retrieval processing unit according to the extracted characteristic descriptors to obtain the retrieval result, and the retrieval result is sent from the first retrieval processing unit to the second retrieval processing unit to make the second retrieval processing unit present the retrieval result to the user through the user interface unit.

Therefore, the image data retrieval based on the character descriptors can be efficiently performed.

The image retrieval system according to the present invention further comprises a characteristic descriptor reliability calculating unit for calculating a degree of reliability of each characteristic descriptor produced in the characteristic descriptor producing unit. The for-retrieval description data producing unit describes each characteristic descriptor and the degree of reliability of the characteristic descriptor as one piece of for-retrieval description data while holding the correspondence of the piece of for-retrieval description data to the space-time structure of the pieces of input image data, the pieces of for-retrieval description data of the pieces of input image data stored in the image information storing unit are analyzed in the first retrieval processing unit according to the retrieval request information sent from the second retrieval processing unit to extract the characteristic descriptors and the degrees of reliability of the characteristic descriptors, a conformity judgment processing is performed in the first retrieval processing unit according to the extracted characteristic descriptors and the degrees of reliability of the characteristic descriptors to obtain the retrieval result, and the retrieval result is sent from the first retrieval processing unit to the second retrieval processing unit to make the second retrieval processing unit present the retrieval result to the user through the user interface unit.

Therefore, the retrieval can be efficiently performed.

In an image retrieval system according to the present invention, the necessity of the conformity judgment processing for each characteristic descriptor is estimated in the first retrieval processing unit according to the degree of reliability of the characteristic descriptor in case of the conformity judgment processing, and the conformity judgment processing for the characteristic descriptor is skipped in cases where it is judged that the conformity judgment processing for the characteristic descriptor is not necessary.

Therefore, the retrieval processing can be performed at high speed, and the retrieval efficiency can be moreover improved.

The image retrieval system according to the present invention further comprises a characteristic descriptor retrieval order determining unit for determining a use order of the characteristic descriptors in the retrieval according to the degrees of reliability calculated in the characteristic descriptor reliability calculating unit. The for-retrieval description data producing unit describes each characteristic descriptor, the degree of reliability of the characteristic descriptor and the use order in the retrieval as one piece of for-retrieval description data while holding the correspondence of the piece of for-retrieval description data to the space-time structure of the pieces of input image data, the pieces of for-retrieval description data of the pieces of input image data stored in the image information storing unit are analyzed in the first retrieval processing unit according to the retrieval request information sent from the second retrieval processing unit to extract the characteristic descriptors, the degrees of reliability of the characteristic descriptors and the use order in the retrieval, a conformity judgment processing is performed in the first retrieval processing unit according to the extracted characteristic descriptors, the degrees of reliability and the use order in the retrieval to obtain the retrieval result, and the retrieval result is sent from the first retrieval processing unit to the second retrieval processing unit to make the second retrieval processing unit present the retrieval result to the user through the user interface unit.

Therefore, the image data retrieval based on the characteristic descriptors, the degrees of reliability and the use order in the retrieval can be efficiently performed.

In an image retrieval system according to the present invention, the retrieval request information, in which a use order of the characteristic descriptors in the retrieval, is sent from the second retrieval processing unit to the first retrieval processing unit as the retrieval request sent from the user through the user interface unit, and a retrieval order of the characteristic descriptors is renewed in the first retrieval processing unit according to the use order in the retrieval which is included in the retrieval request information sent from the second retrieval processing unit to perform a retrieval processing corresponding to the retrieval request of the user.

Therefore, the retrieval processing corresponding to the retrieval request of the user can be performed.

In an image retrieval system according to the present invention, the number of characteristic descriptor candidates in the retrieval result obtained in the conformity judgment processing is determined according to the degrees of reliability of the characteristic descriptors in the first retrieval processing unit for each of a plurality of retrieval steps of which an applied order is determined according to the use order in the retrieval, and the conformity judgment processing is performed.

Therefore, the retrieval processing can be performed at high speed.

The image retrieval system according to the present invention further comprises a video data reproducing server, and a video data decoding and reproducing unit. Each piece of input image data denotes a piece of video data, a piece of key image data representing each of pieces of video data specified in the retrieval is sent from the first retrieval processing unit to the second retrieval processing unit as the retrieval result, each piece of key image data is received in the second retrieval processing unit as the retrieval result sent from the first retrieval processing unit to present the retrieval result to the user through the user interface unit, a reproduction request indicating a specific key image, which is selected by the user from a plurality of key images indicated by the pieces of key image data, is sent from the user interface unit and is received in the video data reproducing server, a piece of specific video data represented by the specific key image is read out from the image information storing unit and is sent to the video data decoding and reproducing unit, and the piece of specific video data sent from the video data reproducing server is received in the video data decoding and reproducing unit, is decoded and is received.

Therefore, a total amount of transferred information can be effectively reduced.

An image retrieval method according to the present invention comprises the steps of extracting a plurality of image characteristic values from pieces of input image data to produce a characteristic descriptor for each piece of input image data, describing each characteristic descriptor as a piece of for-retrieval description data while holding the correspondence of the piece of for-retrieval description data to a space-time structure of the pieces of input image data, storing each piece of for-retrieval description data with the piece of input image data corresponding to the piece of for-retrieval description data, analyzing the pieces of stored for-retrieval description data of the pieces of input image data according to a retrieval request sent from a user to extract the characteristic descriptors, performing a conformity judgment processing according to the extracted characteristic descriptors to obtain a retrieval result, and presenting the retrieval result to the user.

Therefore, the image data retrieval based on the characteristic descriptors, the degrees of reliability and the use order in the retrieval can be efficiently performed.

The image retrieval method according to the present invention further comprises the steps of preparing pieces of video data as the pieces of input image data, presenting a piece of key image data, which represents each of pieces of video data specified in the retrieval, to the user as the retrieval result, receiving a reproduction request indicating a specific key image which is selected by the user from a plurality of key images indicated by the pieces of key image data, reading out a piece of specific video data represented by the specific key image, and decoding and reproducing the piece of specific video data.

Therefore, a total amount of transferred information can be effectively reduced.

BRIEF DESCRIPTION OF THE DRAWINGS

FIG. 4 is a diagram showing an example of the processing for producing an instance (an XLM document) of text information from the text information of image attributes.

FIG. 10 is a diagram showing an example of the processing for producing a characteristic descriptor set from an extracted characteristic value.

FIG. 13 is a flow chart showing a conformity judgment processing.

FIG. 15 is a block diagram showing the configuration of a characteristic portion placed on a server side of an image retrieval system according to a second embodiment.

FIG. 20 is a diagram showing the relationship between a user's subjective characteristic and a characteristic descriptor.

DETAILED DESCRIPTION OF THE PREFERRED EMBODIMENTS

The invention will now be described with reference to the accompanying drawings.

Embodiment 1

In a first embodiment, an image retrieval system is described, In this image retrieval system, a user can retrieve desired image data (or a desired image) from pieces of image data (or images) which are stored in one data base or a plurality of data bases distributed in a network. Also, the user can use the desired image data.

The pieces of image data denote compressed static images (for example, JPEG images), compressed moving images (for example, MPEG images) or non-compressed images according to an image using method. Also, an image format is not limited. In this first embodiment, as an example of the present invention, it is supposed that image information is transmitted or collected according to World Wide Web (WWW) of the internet. However, the present invention is not limited to the WWW, and the image retrieval system according to the present invention can be applied for a service based on a wire communication or a wireless communication or a service based on a broadcast network.

Figure 1:
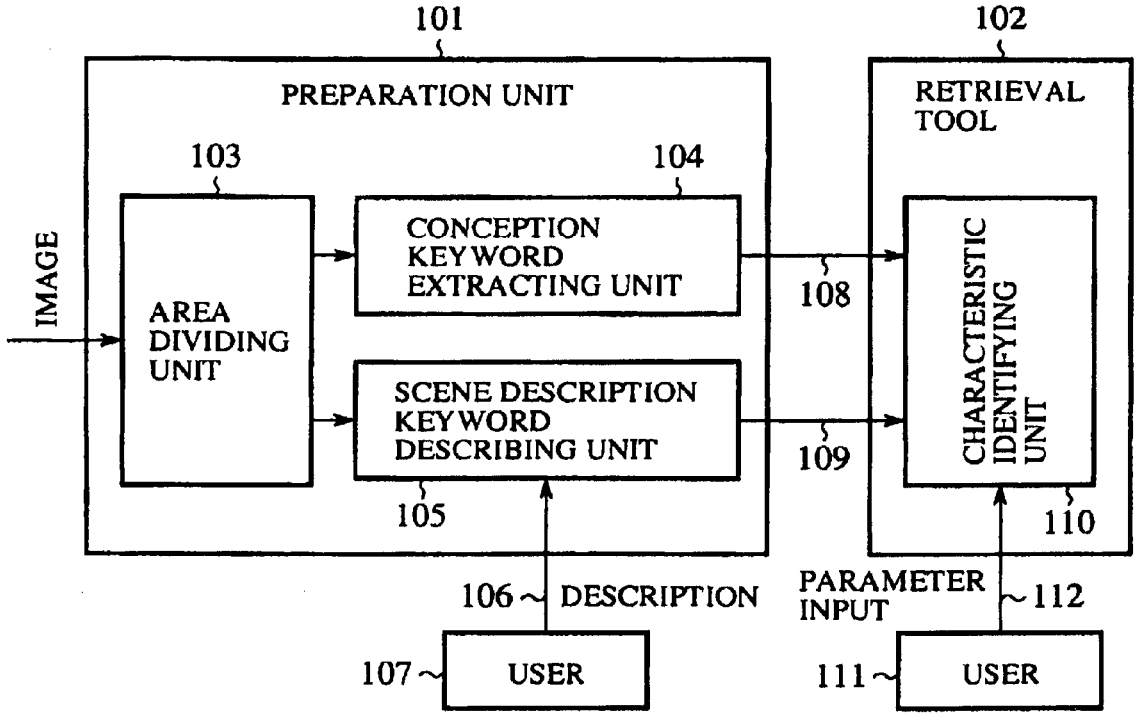
FIG. 1 (PRIOR ART)
FIG. 1 is a diagram showing an example of a conventional image retrieval processing system.
Figure 2:
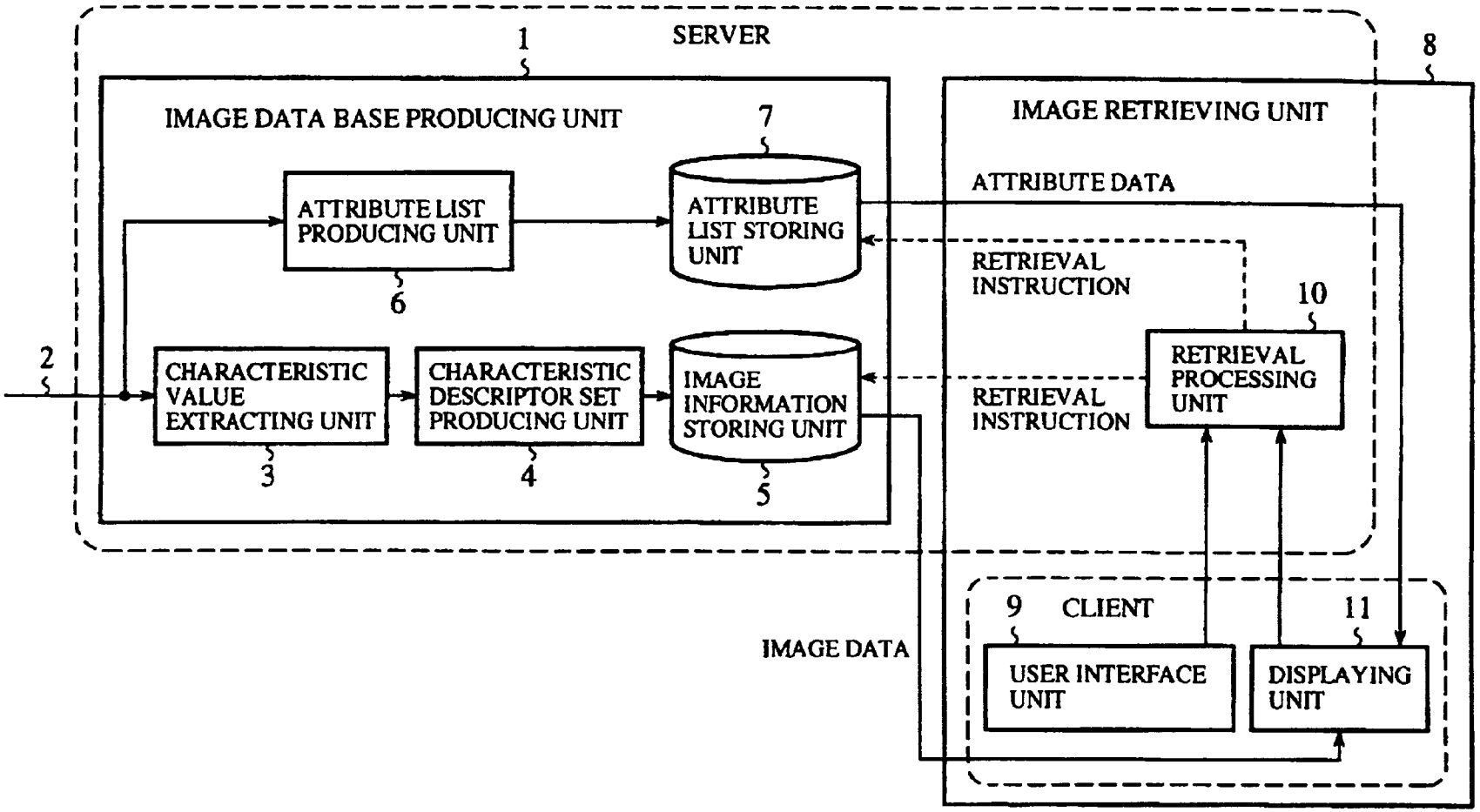
FIG. 2 is a block diagram explaining the configuration of an image retrieval system according to a first embodiment of the present invention.

FIG. 2 is a block diagram explaining the configuration of an image retrieval system according to the first embodiment. Hereinafter, a word "class" denotes a definition of data, and a word "instance" denotes data concretely expressed by a value according to a class definition. For example, the word "instance" denotes a file or a variable.

In FIG. 2, 1 indicates an image data base producing unit. 2 denotes image data and attribute information indicated by text information. The attribute information indicates attributes relating to the image data. 3 indicates a characteristic value extracting unit for extracting a prescribed set of characteristic values (called a characteristic value set) from each piece of image data 2. 4 indicates a characteristic descriptor set producing unit for producing a set of characteristic descriptors (called a characteristic descriptor set), which denotes a set of instances (called an instance set), from the characteristic value set extracted in the characteristic value extracting unit 3 according to a definition of a characteristic value description data class which is common to another image data base producing unit 1 or another server. 5 indicates an image information storing unit for storing each piece of image data and the characteristic descriptor set corresponding to the piece of image data in a pair.

Also, in FIG. 2, 6 indicates an attribute list producing unit for producing a list of attributes (called an attribute list), which denotes an instance set, from the pieces of attribute information 2 according to a definition of a text information description data class which is common to another image data base producing unit 1 or another server. 7 indicates an attribute list storing unit for storing the attribute list corresponding to the pieces of attribute information 2. 8 indicates an image retrieving unit. 9 indicates a user interface unit for selecting an image, which is desired to be retrieved, according to a category or a key image of image data to be retrieved. 10 indicates a retrieval processing unit for performing a retrieval processing according to retrieval conditions indicated in the user interface unit 9. 11 indicates a displaying unit for displaying a retrieved key image and a retrieved image. Here, in this first embodiment, the attribute list and the characteristic descriptor set are generically defined as meta data.

Also, in FIG. 2, a server comprises the image data base producing unit 1, which is composed of the characteristic value extracting unit 3, the characteristic descriptor set producing unit 4, the image information storing unit 5, the attribute list producing unit 6 and the attribute list storing unit 7, and the retrieval processing unit 10 of the image retrieving unit 8. A client comprises the user interface unit 9 and the displaying unit 11 of the image retrieving unit 8. An image retrieval system according to the present invention comprises the server and the client. However, the present invention is not limited to the above-described configuration. For example, it is applicable that the displaying unit 10 be moved from the server to the client. Also, it is applicable that the server additionally have the user interface unit 9 and the displaying unit 11 to add a function of the client to the server. Also, there are a plurality of image data base producing units 1 or a plurality of servers, and there are a plurality of image retrieving units 8 or a plurality of clients. The plurality of image data base producing units 1 or the plurality of servers are connected with the plurality of image retrieving units 8 or the plurality of clients through a network such as an internet. As is described above, the characteristic descriptor set and the attribute list are produced according to the characteristic value description data class and the text information description data class which are common to the plurality of image data base producing units 1 or the plurality of servers.

Next, the processing performed in each unit is described in detail.

(1) Processing of the Image Data Base Producing Unit 1

Figure 3:
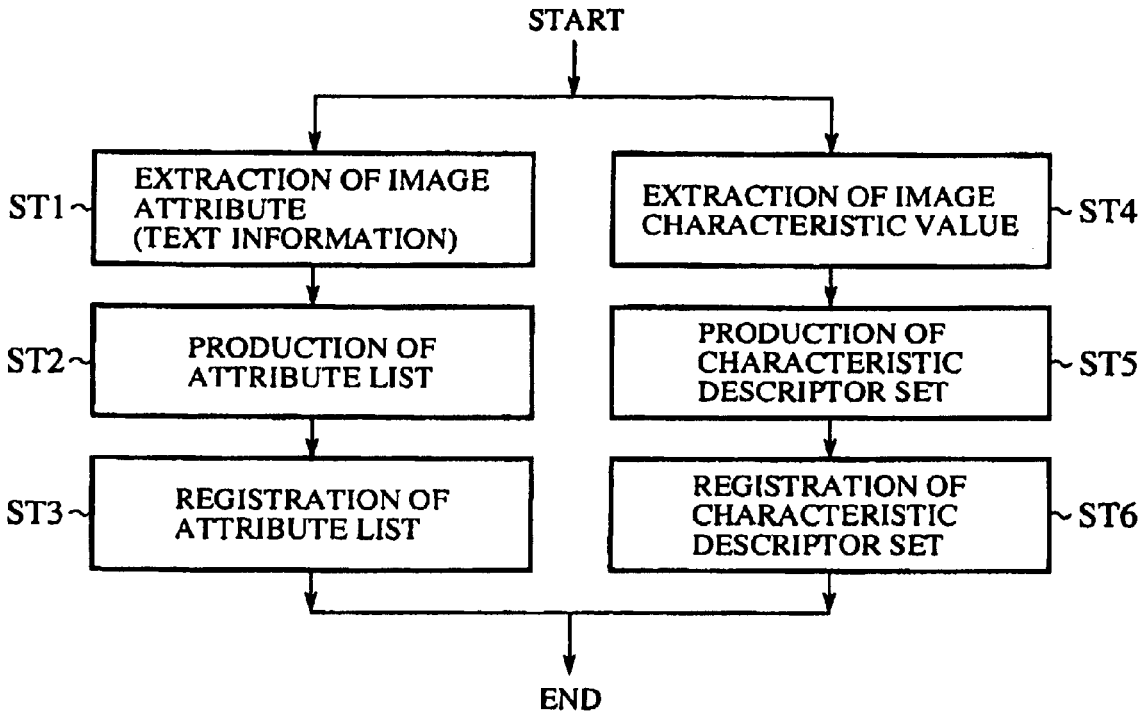
FIG. 3 is a flow chart showing the processing of an image data base producing unit.

FIG. 3 is a flow chart showing the processing of the image data base producing unit 1.

Here, the case where image data is newly registered to an image data base is considered. The registration to an image data base is mainly composed of two types of processing. In one type of processing, an attribute list is produced from text information which indicates image attributes and is attached to image data, and the attribute list is stored in the attribute list storing unit 7. In the other type of processing, characteristic values are extracted from the image data, characteristic descriptors are produced from the characteristic values, and the image data and the characteristic descriptors are stored in the image information storing unit 5 denoting a data base. Next, each type of processing is described in detail.

First, the processing (from a step ST1 to a step ST3) from the production of an attribute list to the registration of the attribute list is described in detail.

Initially, text information, which is attached to and is input with image information and indicates image attributes, is extracted (step ST1). For example, in cases where image data denotes moving image data of a video mail, pieces of information of a sender, a sending date and a title of the is video mail, which are sent with the moving image data, are used as text information indicating image attributes. These pieces of information indicate a producer and a producing date of the moving image data of the video mail, so that these pieces of information denote text information indicating attributes of the moving image data. Also, in another example, in cases where image data denotes a video program of a television broadcasting transmitted from a broadcasting station, pieces of program information (the cast, a producer, a title and a broadcasting date) transmitted with the video program are considered as text information indicating image attributes. Also, in cases where an example, in which home video data or a digital picture is stored in a home server, is supposed, a user directly inputs information relating to a photographing date or a subject as text information, or it is considered that a user transfers the information in a text format from a video apparatus or a camera to a server.

The extracted text information is changed to a format of an attribute list as an instance in the attribute list producing unit 6 (step ST2). For example, a document described in an extensible markup language (XML) is known as a data type of the attribute list.

An example of the processing for producing an XLM document denoting an instance of text information from the text information of image attributes is shown in FIG. 4.

In an example of FIG. 4, text information attached to a video mail as attribute information is extracted, and a document described in the XML is produced from the text information. This XML document denotes unit data corresponding to a constituent unit of an attribute list, and the attribute list is obtained by unifying a plurality of XML documents prepared from a plurality of video mails into a piece of list data. To describe the XML document, a definition file (called a document type definition (DTD)) prescribing a document structure is required. In the document type definition DTD, a relationship between elements included in the document structure and a prescription of an occurrence order of elements are defined.

In the XML document producing processing shown in FIG. 4, elements of "Category", "Author", "Date", "Time", "Title" and "Locator" are included in the element of "TextInfo", and it is indicated that each of the elements is a character type data. The extracted text information is converted into an XML document according to this document type definition DTD. A value of each element in the example of the XML document shown in FIG. 4 is surrounded by a tag <aaa> indicating a start of the element and a tag </aaa> indicating an end of the element. Here, "aaa" denotes an element name defined in the document type definition DTD.

That is, all attributes relating to one video mail are described in a unit area surrounded by <TextInfo> and </TextInfo>. In cases where an attribute list, which is obtained by unifying pieces of attribute data relating to all video mails to be retrieved, is stored, the retrieval of each video mail can be performed by checking attribute data arranged in the unit area surrounded by <TextInfo> and </TextInfo>.

Here, the attribute list is not limited to the above-described data type, but it is applicable that the attribute list be described according to an arbitrary data structure defined in advance. For example, this embodiment is not limited to the attribute list described in a format of the XML document as one data type, but it is applicable that the attribute list be described by using a bit stream type of binary data. In this case, in the same manner as in the XML document, a syntax defining a binary data structure, that is, the prescription of the arrangement of elements and the prescription of the number of bits allocated to each element are required.

The attribute list produced as is described above is stored in the attribute list storing unit 7 (step ST3). Here, in cases where a data base for storing pieces of image data differs from that for storing pieces of text information denoting pieces of attribute information of the pieces of image data, the attribute list, which includes a plurality of addresses of the pieces of image data stored in the data base, is stored in the attribute list storing unit 7. For example, in case of the WWW, a net work address (called universal resource locator (URL)), at which each piece of image data is located, is specified. In the example of FIG. 4, an element "Locator" specifying a URL of each piece of image data is included in the XML document denoting the attribute list, and an address of each piece of image data can be specified in the corresponding attribute information of the video mail.

Next, the processing (from a step ST4 to a step ST6) from the extraction of characteristic values of an image to the production and registration of characteristic descriptors is described in detail.

In the characteristic descriptor producing processing of the first embodiment, image data input and stored has a format of a video (or a moving image) bit stream which is compressed and coded according to a prescribed coding type such as MPEG or H.261/H.263.

Figure 5:
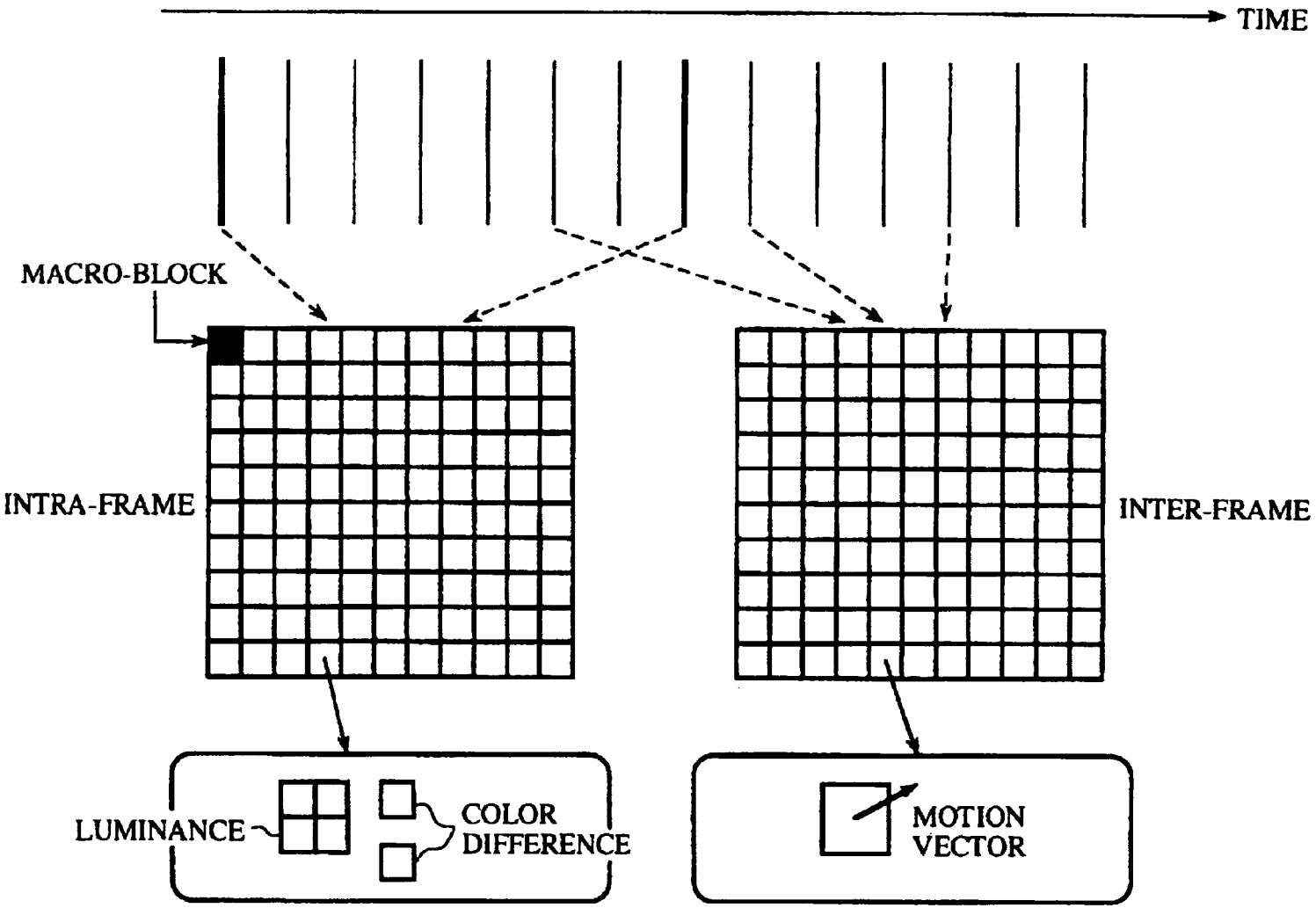
FIG. 5 is a diagram showing an intra/inter adaptive coding.

Initially, characteristic values of an image are extracted from the video bit stream (step ST4). In the first embodiment, motion information and data of direct current components of luminance and color differences in an intra-coded frame are extracted as characteristic values from the compressed video bit stream. In this embodiment, the compressed video bit stream obtained according to one of international standardized coding types such as MPEG and H.261/H.263 is used. In these coding types, a motion compensation prediction (hereinafter, called an inter-coding) or an inner-frame adaptive coding (hereinafter, called an intra-coding) is performed for a video frame signal for each macro-block. Each macro-block is composed of 16*16 pixels, and characteristics of each macro-block are indicated by pieces of pixel data which denote luminance signals of 16*16 pixels, a type of color signals of 8*8 pixels and another type of color difference signals of 8*8 pixels. In particular, in cases where the intra-coding is performed for all macro-blocks of one frame, the frame is called an intra-frame. In this case, pieces of compressed image data of the intra-frame can be expanded without other data, and the intra-frame can be reproduced. In the intra-frame, a plurality of direct current components of the signals of the intra-coded macro-blocks of one frame denote data roughly expressing the whole image of the frame (refer to the lowest portion on the left side in FIG. 5). As shown in FIG. 5, there are many cases that the intra-frame is normally and periodically inserted into a video signal according to a request condition such as a random access.

In contrast, in an inter-coded macro-block in which a predicted residue signal is coded according to the motion compensation prediction, only data, which cannot approximate to a predicted value in the motion prediction, is coded. Therefore, the most essential data in the coded information denotes motion vectors approximating to image information of a major portion of the macro-block (refer to the lowest portion on the right side in FIG. 5). Therefore, in the characteristic value extracting unit 3, direct current components of the luminance and color difference signals of macro-blocks of the intra-frames and motion vectors of inter-coded macro-blocks of inter-frames are extracted from the video bit stream as characteristic values of images.

In a following explanation, a group of frames extending for a prescribed time-period is called a video segment. For example, the most simple video segment is defined as a group of frames which starts from one intra-frame and ends at a frame placed just before a next intra-frame. Also, another video segment having a longer time-period is defined as a group of frames which starts from one intra-frame and ends at a frame placed just before another intra-frame. A time-length of each video segment can be arbitrary set according to the meaning indicated by contents of the video segment.

In the first embodiment, a characteristic descriptor set, which describes characteristics of a video segment, is produced in the characteristic descriptor set producing unit 4 according to a characteristic value set extracted in the characteristic value extracting unit 3 (step ST5). Hereinafter, a characteristic value set extracting procedure and a characteristic descriptor set producing procedure are described in detail.

Figure 6:
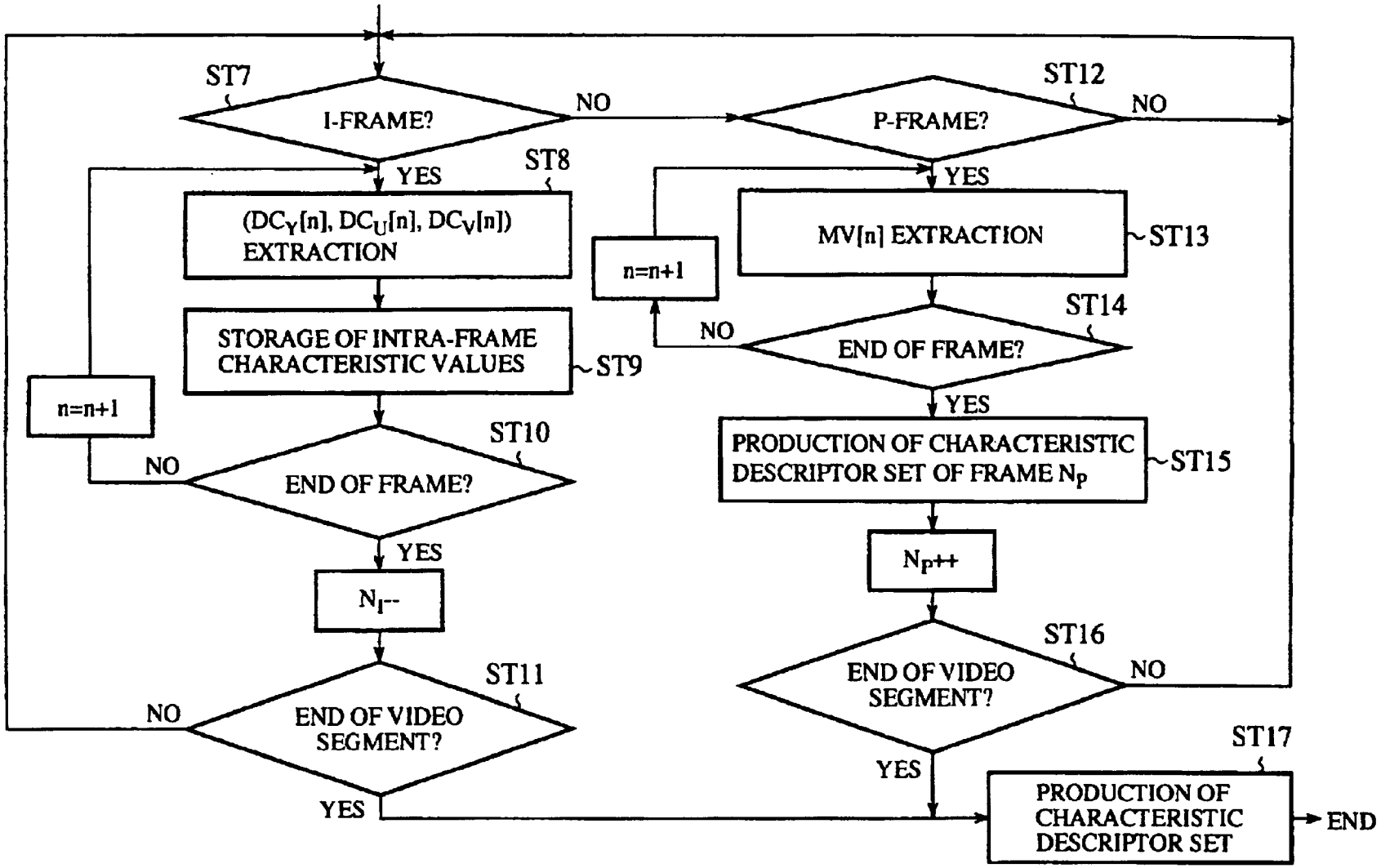
FIG. 6 is a flow chart showing a total characteristic descriptor set producing procedure including both a characteristic value extracting processing and a characteristic descriptor producing processing.

FIG. 6 is a flow chart showing a total procedure for producing a characteristic descriptor set in which both the characteristic value extracting processing of the step ST4 and the characteristic descriptor producing processing of the step ST5 shown in FIG. 3 are included.

Here, it is applicable that each video bit stream, which denotes image data and is input to the characteristic value extracting unit 3, correspond to one video segment. Also, it is applicable that a video bit stream, which is represented by a video program extending for a long time-period and is input to the characteristic value extracting unit 3, correspond to a plurality of video segments. In case of the video bit stream extending for a long time-period, a time-length corresponding to each video segment is specified in the characteristic value extracting unit 3 according to an instruction sent from the outside or is specified by performing a prescribed distinguishing processing in the characteristic value extracting unit 3, and the extraction of one characteristic value set and the production of one characteristic descriptor set are performed for each specified time-length of each video segment. Hereinafter, an operation of the image data base producing unit 1 is described in the case where one video bit stream is input to the image data base producing unit 1 for each video segment. As is described above, each video segment is composed of a set of frames starting from one intra-frame. The extraction of the characteristic values is performed for each frame, and the extraction of the characteristic values from each intra-frame and the extraction of the characteristic values from each inter-frame are performed. In case of the intra-frame, direct current components of the luminance and color difference signals are extracted. In case of the inter-frame, motion vectors are extracted.

In detail, the video bit stream is initially searched for header information of each frame in a step ST7. In cases where it is detected that a current frame is an intra-frame (I-frame) ("YES" in the step ST7), data of direct current components of luminance and color difference signals, which denotes an average matrix of pixel values, is extracted for each macro-block in a step ST8. In FIG. 6, a position of each macro-block is expressed by "n" in an order of the raster scan performed for the frame, a direct current component of the luminance signal of a macro-block placed at a position "n" is expressed by $DC_Y[n]$, and direct current components of two color difference signals of a macro-block placed at a position "n" is expressed by $DC_U[n]$ and $DC_V[n]$ respectively. The maximum value of "n" is determined according to the number of pixels arranged in the longitudinal and lateral directions of the frame. In the international standardized video coding types such as MPEG and H.26X series, because the three direct current components of each macro-block are represented by three DC components of a (0,0) position in a discrete cosine transformation (DCT) performed for each of sub-blocks which compose the macro-block and respectively have 8*8 pixels, the three direct current components of each macro-block can be obtained by detecting the DC components of the (0,0) position. In this case, because four sub-blocks exist in each macro-block for the luminance signal, the direct current component of the luminance signal is set to an average value of four DC components of four sub-blocks for each macro-block.

Thereafter, in a step ST9, characteristic values of one intra-frame are respectively accumulated for each intra-frame. This step is performed in the characteristic descriptor set producing unit 4. In detail, the direct current components $DC_Y[n]$, $DC_U[n]$ and $DC_V[n]$ of one intra-frame are accumulated according to following equations (1) for each intra-frame.

$$avgY_{sum}[n]=avgY_{pre}[n]+DC_Y[n];\ avgY_{pre}[n]=avgY_{sum}[n] \quad (1)$$

$$avgU_{sum}[n]=avgU_{pre}[n]+DC_U[n];\ avgU_{pre}[n]=avgU_{sum}[n]$$

$$avgV_{sum}[n]=avgV_{pre}[n]+DC_V[n];\ avgV_{pre}[n]=avgV_{sum}[n]$$

$$stdY_{sum}[n]=stdY_{pre}[n]+DC_Y[n]*DC_Y[n];$$

$$stdY_{pre}[n]=stdY_{sum}[n]$$

$$stdU_{sum}[n]=stdU_{pre}[n]+DC_U[n]*DC_U[n];$$

$$stdU_{pre}[n]=stdU_{sum}[n]$$

$$stdV_{sum}[n]=stdV_{pre}[n]+DC_V[n]*DC_V[n];$$

$$stdV_{pre}[n]=stdV_{sum}[n]$$

Here, values of $avgY_{pre}[n]$, $avgU_{pre}[n]$, $avgV_{pre}[n]$, $stdY_{pre}[n]$, $stdU_{pre}[n]$ and $stdV_{pre}[n]$ are respectively reset to zero when the characteristic value extraction processing is started.

When the extraction and storage processing for all positions "n" of the macro-blocks in one intra-frame is completed ("YES" in a step ST10), an intra-frame occurrence number $N_I$ in the video segment, which is counted in a counter, is incremented, and the extraction and storage processing for a next frame is performed ("NO" in a step ST11). In cases where the extraction and storage processing for the video segment is completed ("YES" in the step ST11), the procedure is moved to the characteristic descriptor set producing processing of a step ST17.

Next, the extraction of characteristic values of an inter-frame is described.

In cases where it is judged that a current frame is not an intra-frame ("NO" in the step ST7), it is examined in a step ST12 whether or not the frame is an inter-frame (P-frame) of a forward directional (or one-directional) prediction. Here, the reason that the inter-frame is limited to the P-frame is as follows. As another frame coding type of inter-frame, there is a both-directional prediction frame (B-frame) in which a motion compensation prediction is performed while referring to both a frame corresponding to a past time and a frame corresponding to a future time. Also, there is a sprite prediction frame (S-frame, S-VOP) in which an image is reproduced by deforming and combining all-scenery images called a sprite. To distinguish the inter-frame processed in this embodiment from the B-frame and S-frame, the inter-frame is limited to the P-frame. In this embodiment, the inter-frame (P-frame), in which a forward directional (or one-directional) prediction is performed while referring to only a frame corresponding to a past time, is processed. Therefore, in cases where it is judged that the frame is not a P-frame ("NO" in the step ST12), no extraction of characteristic values is performed, and the procedure is moved to the processing for another frame.

In cases where it is judged in the step ST12 that the frame is a P-frame ("YES" in the step ST12), a plurality of motion vectors MV[n] of all macro-blocks of the frame is extracted in the characteristic value extracting unit 3 (step ST13). Here, each motion vector MV[n] is expressed according to a following equation (2).

$$MV[n]=\sqrt{(x_n^2+y_n^2)} \quad (2)$$

$x_n$: a lateral component of the motion vector at the position "n" of the macro-block $y_n$: a longitudinal component of the motion vector at the position "n" of the macro-block Thereafter, when it is judged in a step ST14 that the extraction of the motion vectors MV[n] of all macro-blocks of the current frame is completed ("YES" in the step ST14), a characteristic descriptor set of the inter-frame denoting the current frame is produced in a step ST15. This production is performed in the characteristic descriptor set producing unit 4.

Figure 7:
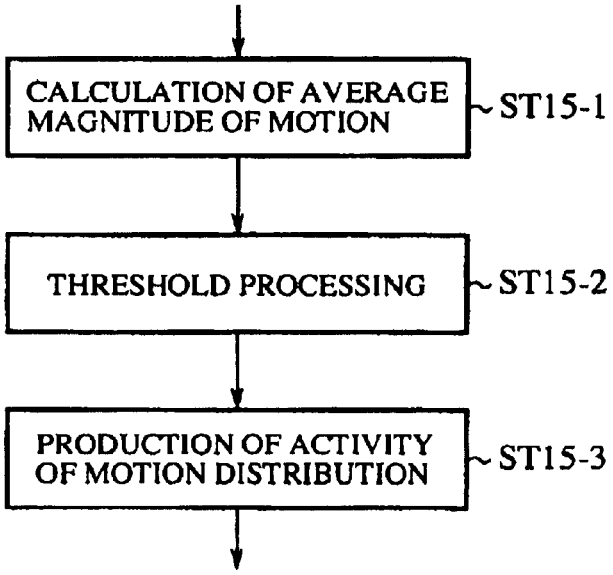
FIG. 7 is a flow chart concretely showing a producing procedure of a characteristic descriptor set producing processing.

A flow chart of the producing procedure of the characteristic descriptor set performed in the step ST15 of FIG. 6 is shown in FIG. 7 in detail. Initially, an average magnitude of motion in a frame is calculated from magnitudes of the motion vectors MV[n] of the frame stored in the step ST13 according to a following equation (3) (step ST15-1).

$$C_{NP} = (1/N) * \sum_{N=0}^{N-1} MV[n] \quad (3)$$

Here, N denotes the number of macro-blocks in one frame.

Thereafter, in a step ST15-2, a threshold processing is performed for each motion vector MV[n] according to a following equation (4).

$$MV'[n]=MV[n];\ \text{if } MV[n] \geqq C_{NP} \quad (4)$$

$$MV'[n]=0;\ \text{if } MV[n] < C_{NP}$$

Therefore, a distribution (or an matrix) of new motion vectors MV'[n] is obtained. Thereafter, values characterizing a motion distribution are obtained as follows by scanning the distribution of the motion vectors MV'[n] in the raster scan order (step ST15-3).

Figures 8, 9:
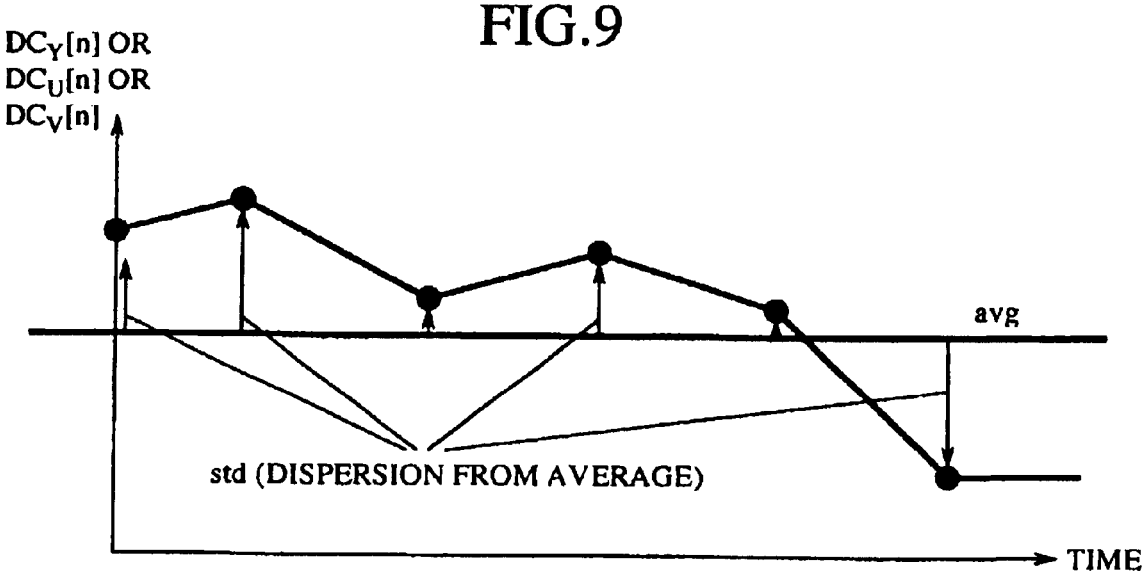
FIG. 8 is a diagram showing an example of values characterizing a motion distribution.
FIG. 9 is a diagram showing the meaning of a descriptor set of an intra frame.

$N_{sr}$: the number of zero runs (that is, short runs) respectively having a length equal to or shorter than a length corresponding to ⅓ of the number of pixels serially arranged in the lateral direction of the frame $N_{mr}$: the number of zero runs (that is, middle runs) which respectively have a length higher than a length corresponding to ⅓ of the number of pixels serially arranged in the lateral direction of the frame and have a length shorter than a length corresponding to ⅔ of the number of laterally-arranged pixels $N_{lr}$: the number of zero runs (that is, long runs) respectively having a length equal to or higher than a length corresponding to ⅔ of the number of pixels serially arranged in the lateral direction of the frame Here, as is realized in FIG. 8, the complexity of the motion is high in a frame in which many short runs exist, and the motion is distributed in a wide area of the frame. In contrast, the motion is localized in a frame in which many long runs exist.

When the extraction and storage processing for all positions "n" of the macro-blocks in one inter-frame is completed ("YES" in the step ST14), an inter-frame occurrence number $N_p$ in the video segment, which is counted in a counter, is incremented, and the extraction and storage processing for a next frame is performed ("NO" in a step ST16). In cases where the extraction and storage processing for the video segment is completed ("YES" in the step ST16), the procedure is moved to the characteristic descriptor set producing processing of the step ST17.

As a result, a characteristic descriptor set ($C_{NP}$, $N_{sr}$, $N_{mr}$, $N_{lr}$) of each inter-frame arranged in the video segment is obtained. The characteristic descriptor set is accumulated for each inter-frame to produce a characteristic descriptor set of the video segment in the step ST17 (described later in detail).

As is described above, the extraction of the characteristic values and the production of the characteristic descriptor set are performed for each frame of the video segment. Thereafter, a characteristic descriptor set of the video segment is finally produced in the step ST17. This production is also performed in the characteristic descriptor set producing unit 4.

In detail, in case of the intra-frame, a characteristic descriptor set (avgY[n], avgU[n], avgV[n], stdY[n], stdU[n] and stdV[n]) is produced from the stored characteristic values $avgY_{sum}$ [n], $avgU_{sum}$[n], $avgV_{sum}$[n], $stdY_{sum}$[n], $stdU_{sum}$[n] and $stdV_{sum}$[n] and the number $N_I$ of the intra-frames existing in the video segment according to following equations (5) for each position "n" of the macro-block.

$$\begin{aligned} avgY[n] &= avgY_{sum}[n]/N_I \\ avgU[n] &= avgU_{sum}[n]/N_I \\ avgV[n] &= avgV_{sum}[n]/N_I \\ stdY[n] &= \sqrt{\{stdY_{sum}[n]/N_I - (avgY[n])^2\}} \\ stdU[n] &= \sqrt{\{stdU_{sum}[n]/N_I - (avgU[n])^2\}} \\ stdV[n] &= \sqrt{\{stdV_{sum}[n]/N_I - (avgV[n])^2\}} \end{aligned} \quad (5)$$

As a result, as for the intra-frame, N*6 characteristic descriptors are produced for each video segment, and a characteristic descriptor set is composed of N*6 characteristic descriptors. The meaning of these characteristic descriptors is described with reference to FIG. 9.

Initially, the extraction of direct current components of the macro-blocks of each frame is equivalent to the drawing of a waveform obtained by plotting an average brightness and an average color of image data at a position "n" of each macro-block with respect to a time axis. That is, a time series of characteristic values avgY[n] indicates the time-changing of the brightness at the position "n" of each macro-block, a time series of characteristic values avgU[n] and a time series of characteristic values avgV[n] respectively indicate the time-changing of the color at the position "n" of each macro-block. Also, the characteristic value stdY[n] indicates a degree of dispersion of the waveform shown in FIG. 9 from the average value(avgY[n]), the characteristic value stdU[n] indicates a degree of dispersion from the average value (avgU[n]), and the characteristic value stdV[n] indicates a degree of dispersion from the average value (avgV[n]). Therefore, the characteristic descriptor set (avgY[n], avgU[n], avgV[n], stdY[n], stdU[n] and stdV[n]) denotes a series of descriptors characterizing a time change of the brightness and a time change of the color in a series of intra-frames of the video segment. It is assumed that waveforms of the direct current components $DC_Y$[n], $DC_U$[n] and $DC_V$[n] are stored as characteristic descriptors, the number of characteristic descriptors is infinitely increased according to the length of the video segment. However, in this embodiment, because the characteristic descriptors avgY[n], avgU[n], avgV[n], stdY[n], stdU[n] and stdv[n] are used, characteristics relating to the brightness and color of the video segment can be described by the characteristic descriptors, of which the number is a constant value of N*6, on condition that a time change of the characteristics of the video segment is held and the number of characteristic descriptors does not depend on the length of the video segment.

In contrast, as for the inter-frame, the characteristic descriptor set ($C_{NP}$, $N_{sr}$, $N_{mr}$, $N_{lr}$) produced for each inter-frame is averaged for the inter-frames of which the number is $N_P$ in the video segment. Therefore, as for the inter-frame, four characteristic descriptors are produced for each video segment.

In addition, the characteristic descriptor set is expressed in a specific structure so as to heighten the convenience as to the retrieval. That is, there is a case that a data format of the characteristic descriptor set is set to that of the XML document in the same manner as that of the attribute list.

The processing for producing a characteristic descriptor set from the extracted characteristic values is shown in FIG. 10.

As shown in FIG. 10, the characteristic value set extracted from the video bit stream in the characteristic value extracting unit 3 is transformed into an XML document denoting a characteristic descriptor set according to the document type definition (DTD). In the characteristic descriptor set shown in FIG. 10, the characteristic descriptor set relating to the motion vectors and the characteristic descriptor set relating to the direct current components of the luminance and color difference signals described above are included. Information surrounded by <MotionInfo> and </MotionInfo> denotes the characteristic descriptor set relating to the motion vectors, and the characteristic descriptors ($C_{NP}$, $N_{sr}$, $N_{mr}$, $N_{lr}$) are surrounded by tags "Average", "Shortrun", "MediumRun" and "LongRun" respectively and are described.

Also, information surrounded by <ColourTexture> and </ColourTexture> denotes the characteristic descriptor set relating to the direct current components of the luminance and color difference signals. In this information, information surrounded by <YDC> and </YDC> denotes a set of the characteristic descriptors relating to the direct current components of the luminance signal, and the characteristic descriptors (avgY[n], stdY[n]) are surrounded by tags "Average" and "std" respectively. Also, information surrounded by <UDC> and </UDC> and information surrounded by <VDC> and </VDC> respectively denote a set of the characteristic descriptors relating to the direct current components of the color difference signals, and the characteristic descriptors (avgU[n], stdU[n]) and the characteristic descriptors (avgV[n], stdV[n]) are surrounded by tags "Average" and "std" respectively.

Also, the characteristic descriptor set shown in FIG. 10 includes auxiliary information relating to media in addition to the characteristic descriptor set relating to the motion vectors and the characteristic descriptor set relating to the direct current components of the luminance and color difference signals. In FIG. 10, information surrounded by <MediaInfo> and </MediaInfo> denotes the auxiliary information, and image format (Format) such as MPEG-1 or JPEG, type of a storing medium (Medium) such as CD or DVD, information relating to color such as a colored image or a monochrome image, image size and information indicating a terminal performance required to display image are included as the auxiliary information. This auxiliary information is required when a user reproduces and displays a retrieved image, and the user can specify the auxiliary information as retrieval conditions. Also, specific information indicating an address, at which an image is stored, is included as the auxiliary information. In the example of FIG. 10, information surrounded by <Locator> and </Locator> denotes the specific information, and the specific information is specified by the universal resource locator (URL).

As a characteristic descriptor other than those shown in FIG. 10, a specific characteristic descriptor, which describes an image characteristic indicating a prescribed meaning, is known. This specific characteristic descriptor expresses a team name of a player displayed in a sport picture or a relationship between persons displayed in a picture. In cases where home video data or a digital photograph is stored in a home server, a user directly inputs a meaning characteristic indicated by a subject of a picture as text information. Also, in cases where a program of the television broadcasting is stored in a home server, the specific characteristic descriptor can be automatically extracted according to program information.

In addition, as another characteristic descriptor other than those shown in FIG. 10, in addition to the average characteristics in the video segment indicated by the characteristic descriptor set ($C_{NP}$, $N_{sr}$, $N_{mr}$, $N_{lr}$) of the inter-frames, it is applicable that a variance (or a standard deviation) of a characteristic descriptor in the inter-frames of the video segment be calculated and added to the characteristic descriptor set ($C_{NP}$, $N_{sr}$, $N_{mr}$, $N_{lr}$) as an index of the complexity of a time change of the characteristic descriptor, that is, as an index of the complexity relating to a motion change, in the same manner as the characteristic descriptor set for the intra-frames of the video segment. In this case, the characteristic value indicating the time change of the motion can be added.

Also, it is applicable that the characteristic descriptor set relating to the intra-frames of the video segment be processed in the same manner as in the production of the characteristic descriptor set relating to the inter-frames of the video segment to reduce the number of characteristic descriptors. For example, values ($C_{Y,NI}$, $C_{U,NI}$, $C_{V,NI}$) are calculated according to following equations (6) for each intra-frame. The value $C_{Y,NI}$ denotes the average-in-screen of luminance values in the $N_I$-th intra-frame of the video segment, and the values $C_{U,NI}$ and $C_{U,NI}$ respectively denote the average-in-screen of color difference values in the $N_I$-th intra-frame of the video segment.

$$C_{Y,NI} = (1/N_{mb}) * \sum_{n=1}^{N_{mb}} DC_{Y,NI}[n] \tag{6}$$

$$C_{U,NI} = (1/N_{mb}) * \sum_{n=1}^{N_{mb}} DC_{U,NI}[n]$$

$$C_{V,NI} = (1/N_{mb}) * \sum_{n=1}^{N_{mb}} DC_{V,NI}[n]$$

Here, $N_{mb}$ denotes the number of macro-blocks in each intra-frame.

Therefore, in cases where the values ($C_{Y,NI}$, $C_{U,NI}$, $C_{V,NI}$) relating to one intra-frame are used in the same manner as the value CNP relating to one inter-frame, the values ($C_{Y,NI}$, $C_{U,NI}$, $C_{V,NI}$) can be set as three values (a luminance value, a color difference value and another color difference) which correspond to the characteristic descriptors ($N_{sr}$, $N_{mr}$, $N_{lr}$) relating to one inter-frame in the image screen. The set of the values ($C_{Y,NI}$, $C_{U,NI}$, $C_{V,NI}$) describes the complexity of a distribution of luminance and color in a space of luminance and color differences. Therefore, in cases where the set of the values ($C_{Y,NI}$, $C_{U,NI}$, $C_{V,NI}$) is used as a characteristic descriptor set for each intra-frame, the number of characteristic descriptors required to describe the characteristics of the video segment can be reduced by calculating the average and the variance (or the standard deviation) of the characteristic descriptors ($C_{Y,NI}$, $C_{U,NI}$, $C_{V,NI}$) relating to the intra-frames of the video segment. In contrast, in the same manner as the characteristic descriptor set relating to each intra-frame, it is applicable that the characteristic descriptor set relating to each inter-frame be described for each macro-block of the inter-frame while a time change of the characteristics of the inter-frames of the video segment is described with the precision of the macro-block.

Figure 11:
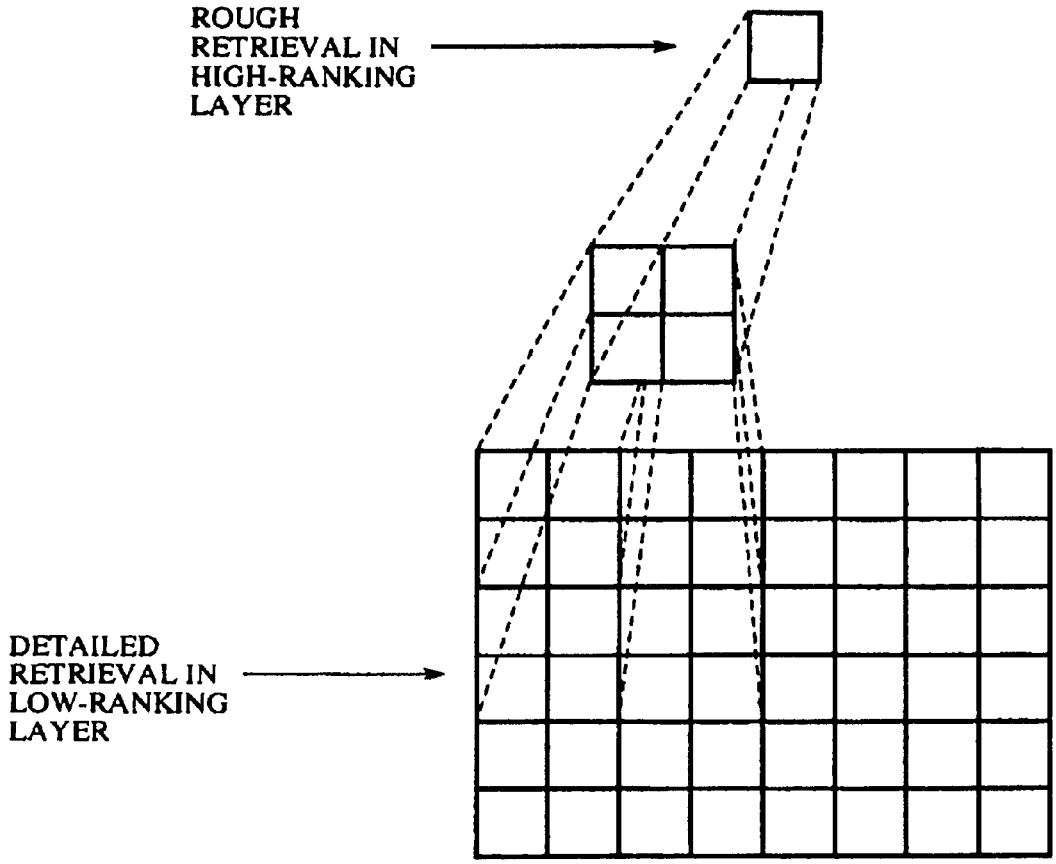
FIG. 11 is a diagram showing an example in which the characteristic descriptor set is hierarchically produced and described.

Also, as shown in FIG. 11, it is applicable that the characteristic descriptor sets corresponding to the macro-blocks of each intra-frame described in the first embodiment be produced and described in a hierarchical structure from a high-ranking layer to a low-ranking layer to perform a hierarchical retrieval. Therefore, all types of changes of the luminance and color differences from a wide-view change in the whole image screen to local changes in the macro-blocks of each image screen can be described, and the retrieval processing can be performed so as to meet the needs of users. Also, in cases where the number of hierarchical layers is additionally specified, it is sufficient to hold the characteristic descriptor sets required for the specified hierarchical layers. Therefore, an amount of data of the characteristic descriptor sets can be appropriately adjusted.

In addition, the number of characteristic descriptor sets relating to the intra-frames of the video segment in the first embodiment depends on the number of macro-blocks. Therefore, in cases where the number of macro-blocks in each frame of one video segment differs from that in another video segment, a conformity judgment processing cannot be strictly performed between the video segments. To solve this problem, the interpolation or thinning-out of characteristic descriptor sets relating to to-be-retrieved image data and the thinning-out or interpolation of characteristic descriptor sets relating to user-proposed image data are performed according to the number of macro-blocks in each of the to-be-retrieved image data and the user-proposed image data to make the number of macro-blocks in the to-be-retrieved image data equal to that in the user-proposed image data, and it is judged whether or not the to-be-retrieved image data matches with the user-proposed image data. This case happens when the retrieval processing is performed for a data base in which many pieces of video contents having various image formats are mixed. However, a predetermined image format is usually used for various practically-used applications (for example, programs of the digital broadcasting) to simplify the facilities required to use the applications, so that the above-described case is not so many. Also, in this embodiment, the extensible markup language (XML) is adopted to describe the characteristic descriptor sets. However, this embodiment is not limited to the XML. For example, in the same manner as in the attribute list, it is applicable that the characteristic descriptor sets be described according to a data structure defined in advance.

As is described above, when a characteristic descriptor set is produced in the processing of the step ST5 in the characteristic descriptor set producing unit 4, the produced characteristic descriptor set is stored with the image data in the image information storing unit 5 (step ST6). In this case, it is applicable that a data base for storing the characteristic descriptor set differ from a data base for storing the image data. In this case, it is required that the characteristic descriptor set includes an address indicating a storing position of the corresponding image data. In the example shown in FIG. 10, the element "Locator" is included in the characteristic descriptor set, and the universal resource locator (URL) is set to the value of the element "Locator".

(2) Processing in the Image Retrieving Unit 8

Next, processing performed in the image retrieving unit 8 is described.

Figure 12:
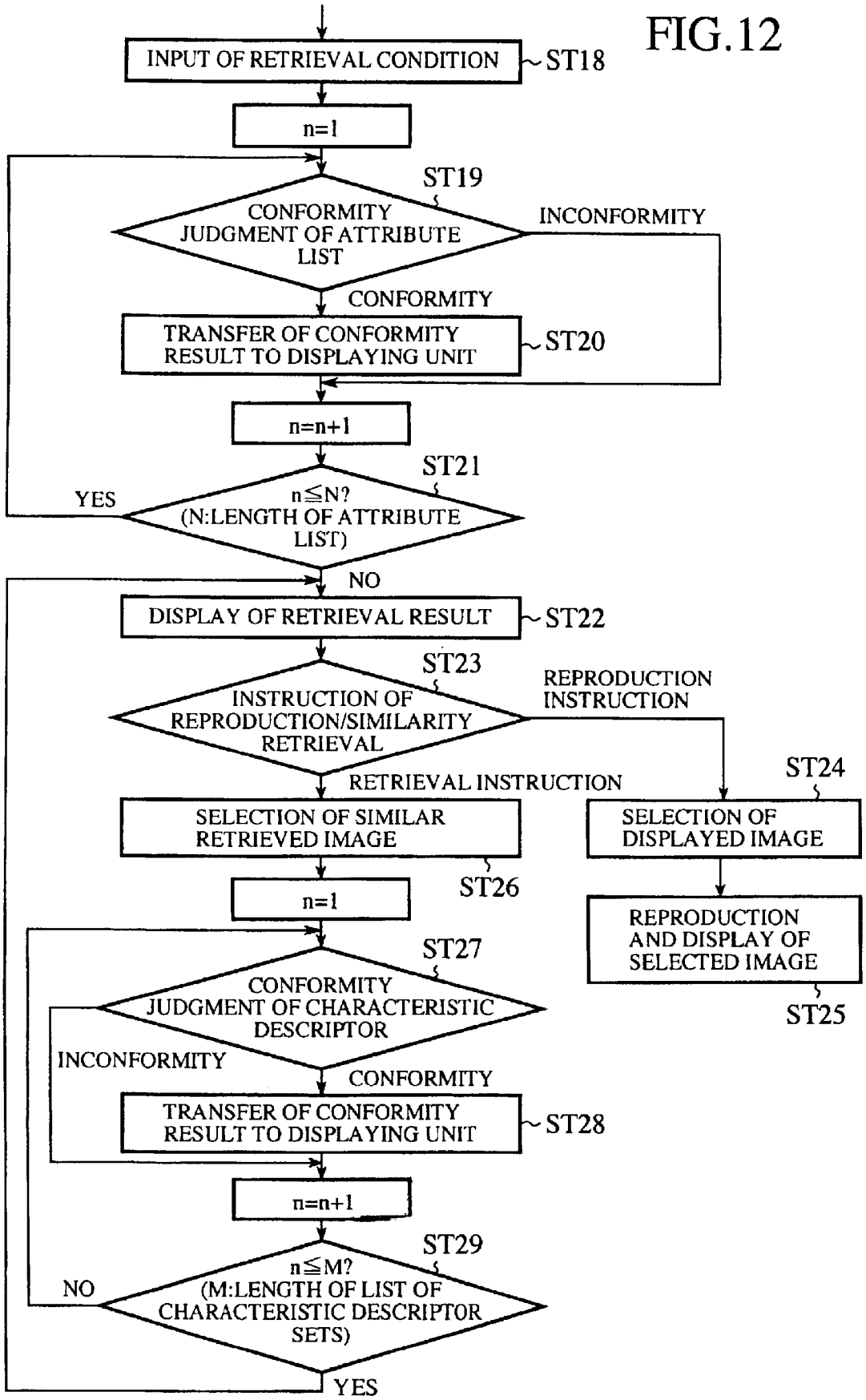
FIG. 12 is a flow chart showing the processing of an image retrieving unit.

FIG. 12 is a flow chart showing the processing performed in the image retrieving unit 8. The processing of the image retrieval is classified into two types of processing. That is, the processing of the image retrieval is composed of the retrieval based on the attribute list and the characteristic similarity retrieval based on the characteristic descriptor sets.

First, the retrieval processing based on the attribute list is described in detail.

Initially, a user inputs a retrieval condition to the image retrieving unit 8 though the user interface unit 9 (step ST18). In this embodiment, for example, user's text information such as a category of an image to be retrieved, a production date of the image and/or a producer of the image is input. The user's text information input by the user is sent to the retrieval processing unit 10. In the retrieval processing unit 10, a conformity judgment processing is performed to judge the conformity of the user's text information with attribute information of an attribute list stored in the attribute list storing unit 7 (step ST19). For example, a user specifies a production date of an image and a producer of the image as a retrieval condition. In the example of FIG. 4, tags of "Date", "Time" and "Author" are searched, and the matching (or conformity) of the retrieval condition with a value surrounded by each tag is judged.

As a result of the conformity judgment processing for the attribute list, in cases where attribute information of a video mail agreeing with the retrieval condition in all elements of the "Date", "Time" and "Author" exists ("YES" in the step ST19), the attribute information of the video mail agreeing with the retrieval condition in all elements of the "Date", "Time" and "Author" is extracted from the attribute list and is sent to the displaying unit 11 (step ST20). Therefore, because text information attached to image data as the attribute information is structurized and described, the attribute information composed of elements required for the retrieval can be extracted, and the matching (or conformity) of the attribute information with the user's text information (or the retrieval condition) can be judged.

The processing in the step ST20 and a step ST21 is repeated until all pieces of attribute information of the attribute list stored in the attribute list storing unit 7 are searched ("NO" in the step ST21). When all pieces of attribute information of the attribute list are searched ("YES" in the step ST21), all pieces of attribute information conforming to the user's retrieval condition are detected in the processing of the step ST20 and are sent to the displaying unit 11.

When all pieces of attribute information conforming to the user's retrieval condition are extracted from all pieces of attribute information of the stored attribute list and the sending of the pieces of attribute information conforming to the user's retrieval condition as a conformity result is completed ("YES" in the step ST21) a list of the pieces of attribute information conforming to the user's retrieval condition is displayed in the displaying unit 11 (step ST22). In the example of FIG. 4, a list of the pieces of attribute information, of which values in the elements "Date", "Time" and "Author" agree with values input by the user as the retrieval condition, is displayed as text information. In this case, as is shown in the example of FIG. 4, when the pieces of attribute information are described in the format of the XML document, the XML document of the pieces of attribute information is transformed, in the displaying unit 11, into a hypertext markup language (HTML) type data possible to be displayed in the Browser. Also, in cases where a hyper link is allocated to the pieces of attribute information, a user can easily access to the pieces of attribute information in a next time. Also, in cases where the image data denotes video data and has a prescribed display area, a key frame of the video data is displayed with the pieces of attribute information. In cases where a link from data of the key frame to the video data is established, the user can intuitively access to the video data.

As is described above, because the attribute list is structurized at a pre-determined data format, the data structure of the attribute list can be analyzed on the user side by using a file (for example, the document type definition (DTD)) in which the data format is defined, and the data format of attribute information of the attribute list can be easily transformed into another data format possible to be displayed.

Next, in cases where attribute information of a desired image exists in the list of the pieces of attribute information displayed in the displaying unit 11, the user inputs a reproduction instruction through the user interface unit 9 (step ST23) and selects attribute information of the desired image (step ST24). Thereafter, image data corresponding to the attribute information of the desired image is extracted, in the image information storing unit 5, according to an address (URL) included in the attribute information of the desired image under the control of the retrieval processing unit 10, the image data corresponding to the attribute information of the desired image is transferred to the displaying unit 11, and the reproduction and display of the image data is performed in the displaying unit 11 (step ST25).

In contrast, in cases where attribute information of a desired image does not exist in the list of the pieces of attribute information displayed in the displaying unit 11 but attribute information similar to the attribute information of the desired image exists in the list of the pieces of attribute information, or in cases where a key frame displayed with the attribute information in the displaying unit 11 is similar to the desired image, the user inputs a similarity retrieval instruction through the user interface unit 9 (step ST23) and selects attribute information (that is, similar attribute information) similar to the attribute information of the desired image to use the similar attribute information in the similarity retrieval (step ST26). Therefore, an image similar to the desired image can be retrieved from images stored in the image information storing unit 5.

That is, when the user inputs the similarity retrieval instruction through the user interface unit 9 (step ST23) and selects the similar attribute information to use the similar attribute information in the similarity retrieval (step ST26), a characteristic similarity retrieval for a plurality of specific characteristic descriptor sets corresponding to the similar attribute information is performed to extract the specific characteristic descriptor sets of a similar image (or a piece of similar image data) selected in the step ST26 from characteristic descriptor sets stored in the image information storing unit 5, and the conformity judgment processing is performed to judge the conformity of each specific characteristic descriptor set of the similar image with characteristic descriptor sets of the other images (or the other pieces of image data) (step ST27). Hereinafter, as is described above, the case where the characteristic values are described as the characteristic descriptor sets relating to the direct current components of the luminance and color difference signals or the motion vectors is described as an example.

FIG. 13 is a flow chart showing in detail an example of the conformity judgment processing performed in the step ST27 of FIG. 12.

Initially, the four characteristic descriptors $C_{NP}$, $N_{sr}$, $N_{mr}$ and $N_{lr}$ relating to the motion vectors of the inter-frames of one video segment and the N*6 characteristic descriptors avgY[n], avgU[n], avgV[n], stdY[n], stdU[n] and stdV[n] relating to the direct current components of the luminance and color difference signals of the intra-frames of the video segment are prepared for each video segment, and it is judged whether or not each of values of the characteristic descriptors of the characteristic descriptor sets of the other images is placed within a prescribed range determined by upper and lower threshold values and the corresponding value of one characteristic descriptor of one specific characteristic descriptor set of the similar image selected in the step S26 (step ST27-1 to step ST27-11). In cases where each of values of all characteristic descriptors of the characteristic descriptor sets of one of the other images is placed within the prescribed range, the conformity is judged for the image. In other cases, the inconformity is judged for the image.

Thereafter, address information (URL) of the image, for which the conformity is judged, is sent to the displaying unit 11 (step ST28). Thereafter, until the conformity judgment processing for all characteristic descriptor sets stored in the image information storing unit 5 is completed ("NO" in a step ST29), the conformity judgment processing for non-judged characteristic descriptor sets is repeatedly performed.

Thereafter, when the conformity judgment processing for all characteristic descriptor sets stored in the image information storing unit 5 is completed ("YES" in a step ST29), each of images corresponding to the conformity judgment is extracted from the images stored in the image information storing unit 5 according to address information of the image in the displaying unit 11, and each extracted image is reproduced and displayed (step ST22). Here, in case of moving image, address information of a key frame of each moving picture corresponding to the conformity judgment is sent to the displaying unit 11, and the key frames of the moving images are reproduced and displayed in the displaying unit 11. Thereafter, the user selects a moving picture, which is desired to be displayed, from a list of the key frames displayed in the displaying unit 11 through the user interface unit 9 (step ST24), and the desired moving picture is reproduced and displayed (step ST25). In this case, it is applicable that the user select another similar image, with which the user desires to again perform the similarity retrieval, (step ST26) to perform the similarity retrieval in the same manner as that described above (step ST27).

Accordingly, in the image retrieval system according to the first embodiment, after the retrieval based on the attribute information is performed while referring to the attribute list, the retrieval based on the characteristic descriptors is performed. Therefore, the retrieval can be efficiently performed.

Here, this embodiment is not limited to the conformity judgment processing of the step ST27, and various methods can be considered as the conformity judgment processing. That is, in the example of FIG. 13, all characteristic descriptors are multiplied by the same weighting value, and each characteristic descriptor is compared with the threshold values. However, in cases where the user regards the motion as important in the retrieval, it is applicable that a compared result of each characteristic descriptor be weighted to obtain a final result. Also, in the example of FIG. 13, compared results of all characteristic descriptors are connected with each other in cascade to obtain a final result. However, it is applicable that an appropriate normalizing processing be performed for compared results of all characteristic descriptors to judge the conformity according to a group of the compared results combined with each other. These conformity judgments can be adjusted to use data of the characteristic descriptors most efficiently in the retrieval according to the retrieval object.

Also, in the retrieval using a plurality of types of characteristic descriptors, it is applicable that the conformity judgment processing (or retrieval equations) be held in the format of descriptor in advance according to a type of the application (retrieval system or database). That is, in cases where the judgment processing is described according to a standard description method, the user can describe a method for using a plurality of characteristic descriptors for the retrieval, and this description does not depend on the application. Therefore, various types of applications can be systematically used in the image retrieval system. Also, for example, in cases where a second data base is connected with the data base of this image retrieval system through an internet and the same characteristic descriptors as those used in the data base are used in the second data base, the retrieval processing can be performed for data of the second data base according to the common conformity judgment processing. As an example of the description of the conformity judgment processing, following descriptions (1) to (7) can be considered.

(1) A method for using a plurality of characteristic descriptors for the conformity judgment is described. For example, one-time retrieval or a series of cascade retrievals is used for the conformity judgment.

(2) A weighting factor, which is determined according to the importance of each characteristic descriptor, is applied for the characteristic descriptor in one-time retrieval processing.

(3) A normalizing method for each characteristic descriptor is provided in one-time retrieval.

(4) An order of descriptors used in the retrieval is provided.

(5) In case of the retrieval in the cascade connection, the number of candidates obtained from the characteristic descriptors is provided for each retrieval.

(6) A value indicating the precision of the description of each characteristic descriptor (how accurate the characteristic is described) is provided.

(7) A judgment standard for judging whether retrieval candidates obtained in the matching of each characteristic descriptor are output in the "AND" connection or the "OR" connection is provided.

It is applicable that these descriptors processed in the conformity judgment processing procedure be described in a fixed description peculiar to the application. Also, it is applicable that these descriptors processed in the conformity judgment processing procedure be described so as to be customized by a user. For example, a user receives information of types of the characteristic descriptors, which is possible to be used for the retrieval, from the image retrieval system, and the user can renew the originally-set conformity judgment processing, which is described as descriptors, to a personal conformity judgment processing, which reflects tastes of the user, according to the information. Therefore, in this case, the user can flexibly perform the retrieval processing. This customizing of the conformity judgment processing in the image retrieval system can be performed in some degree in dependent on the application. However, in cases where a common standard description format is prepared for the conformity judgment processing, the customizing of the conformity judgment processing in the image retrieval system can be widely performed, and data usable in the retrieval processing can be held in a plurality of different types of applications.

Also, as an example for which the image retrieval system is applied, the image retrieval system according to the first embodiment can be applied for a supervisory system. For example, in cases where the image retrieval system is applied for a supervisory system in which a monitoring camera monitors a trespasser, the trespasser can be detected according to characteristic values of motion obtained from a monitored image. Therefore, meta-data, in which characteristic values of motion obtained from the monitored image are described, is registered with a monitored image bit stream in a data base, and information such as a recording date of the monitored image is registered as attribute information of an attribute list. When the user reproduces the monitored image recorded in the data base, text information such as a date is input as a retrieval key, and a keyword of "trespasser" is input as another retrieval key. Thereafter, candidates for the retrieval image are selected from a registered list of images, meta-data attached to the candidates for the retrieval image is retrieved, and images respectively seeming to be related to the trespasser are displayed. Therefore, the user can select a desired image from the displayed images, and the user can watch the desired image. In addition, in cases where the user requests the retrieval of images similar to the desired image already retrieved and obtained, even though an accurate recording date or an accurate recording time of each similar image is unclear, the similar images are retrieved from the stored images by checking the matching of the desired image with each stored image according to the characteristic descriptor sets of the stored image, and the user can obtain a detailed retrieval result.

Also, as another example for which the image retrieval system is applied, the image retrieval system according to the first embodiment can be applied for a system in which a video mail or a broadcast program desired by a user is retrieved from video mails stored in a portable terminal or broadcast programs stored in a home server and is reproduced. An attribute list is composed of pieces of attribute information of broadcast programs recorded in the home server, a title of each broadcast program extracted from program information and cast information. The retrieval is performed when the user inputs information of a desired broadcast program. However, in cases where the user cannot obtain information of the desired broadcast program as a retrieval result, the user can perform the similarity retrieval based on the characteristic descriptor sets attached to each image. Therefore, even if the user do not accurately remember information of the desired broadcast program, the user can retrieve the desired broadcast program according to his impression of the desired broadcast program.

Figure 14:
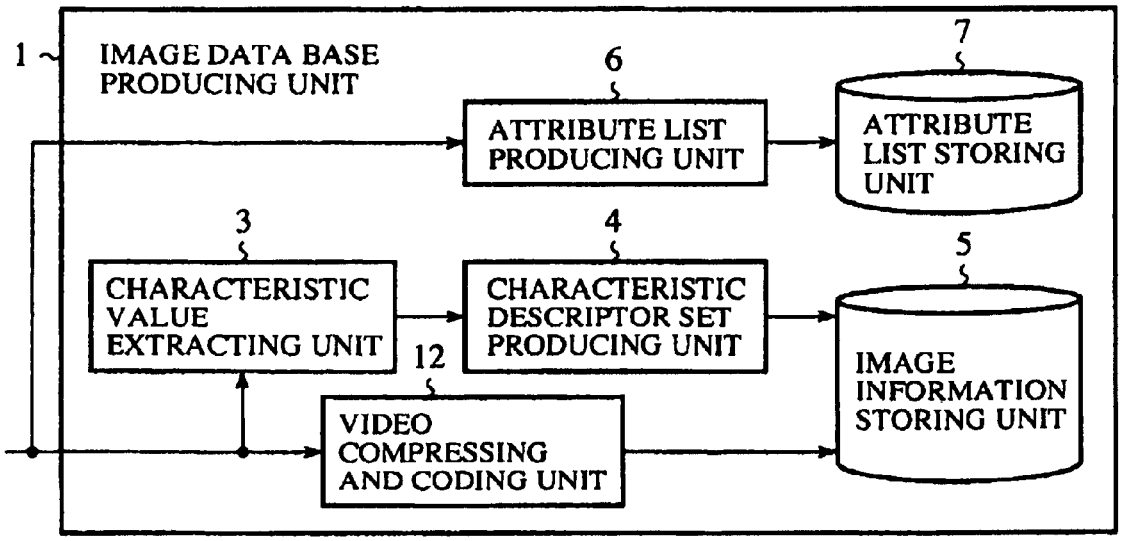
FIG. 14 is a diagram showing another configuration example of an image data base producing unit.

In addition, as to the operations in the characteristic value extracting unit 3 and the characteristic descriptor set producing unit 4, the characteristic values to be extracted and the characteristic descriptor sets to be produced, there are other various examples. For example, as shown in FIG. 14, before non-compressed image data is compressed and coded in a video compressing and coding unit 12, characteristic values are extracted from the non-compressed image data and are sent to the characteristic value extracting unit 3, and the characteristic values are sent to the characteristic descriptor set producing unit 4. As an applied example of the image retrieval system having the image data base producing unit 1 of FIG. 14, the image retrieval system can be applied for a system in which video data obtained by performing the monitoring for a long time is compressed and stored. In this system, characteristics (color, shape, size, motion level and moving direction) of a moving body or a trespassing object are directly detected from digitized video data, which is input from a camera and is not compressed, and are extracted from the digitized video data as characteristic values, and characteristic descriptor sets are produced from the characteristic values in the characteristic descriptor set producing unit 4. Thereafter, in the image information storing unit 5, each characteristic descriptor set is stored with a corresponding video segment which is compressed and coded in the video compressing and coding unit 12.

In this example, because the characteristic values are extracted from the non-compressed video data which has the detailed characteristics of the moving body or the trespassing object, detailed characteristic descriptors (the detailed description of a type of a subject or a locus) can be produced as compared with the case where characteristic values are extracted from compressed data. In contrast, to produce the detailed characteristic descriptors, a complicated calculation processing system is required. Therefore, a high calculation performance is required for the characteristic value extracting unit 3 and the characteristic descriptor set producing unit 4.

This complicated calculation processing system can be applied for not only a monitoring camera but also a video camera, used for a broadcasting service, in which the quality and reliability for image are more important than the cost for image. In this case, the whole image retrieval system described according to this embodiment functions as a video library system in which programs are produced in the broadcasting service. That is, a characteristic descriptor set of each video image (or image data) obtained from the video camera is recorded with the image in a data base. Therefore, images similar to a required image can be efficiently retrieved by using similarity elements held in the images as a key. Also, in cases where the complicated calculation processing system is applied for a personal-use video camera, image data is processed according to a simple preparation function before the compressing and coding for the image data. Therefore, for example, in cases where a characteristic descriptor set relating to a face image of each person is produced and recorded with the face image in a recording medium (for example, a video tape, a personal computer or a hard disk arranged in a home server), an image corresponding to a specific face can be retrieved from a large number of images not put in order according to the matching of each characteristic descriptor set with a retrieval condition.

Accordingly, because the attribute list is used for any application, a plurality of recording mediums and data bases can be uniformly managed from a standpoint of attributes of recorded images, and the addition and deletion of images to be used as candidates for the retrieval can be easily performed by checking the attribute list. Therefore, the construction of the image retrieval system can be uniformly and easily performed as well as the retrieval processing.

Embodiment 2

In a second embodiment, a plurality of types of characteristic descriptors, which describe motion, brightness, color and the like, are extracted from video data of a moving picture, a characteristic descriptor set is produced by combining the types of characteristic descriptors with each other for each macro-block, and the characteristic descriptor sets are used as a key of the retrieval. Therefore, it is possible to reflect a retrieval course intended by a user on an image retrieval system and an image retrieval method according to the second embodiment. Hereinafter, an example of the image retrieval system and image retrieval method is described. Here, in the first embodiment, the retrieval processing unit 10 is arranged in the server. However, in the image retrieval system according to the second embodiment, a retrieval processing unit is arranged in both the server and the client, and the server and the client are connected with each other through both a network A and a network B.

FIG. 15 is a block diagram showing the configuration of a characteristic portion placed on a server side in the image retrieval system according to the second embodiment. That is, FIG. 15 shows a detailed configuration of the characteristic descriptor set producing unit 4 shown in FIG. 2. Also, the retrieval processing unit 10 is divided into a retrieval processing unit 10A and a retrieval processing unit 10B, FIG. 15 shows a block diagram of the retrieval processing unit 10A placed on the server side, and a video reproducing server 218 required to reproduce a retrieval result is shown in FIG. 15.

In FIG. 15, 201 denotes compressed video data, 202 indicates a characteristic descriptor producing unit, 203 denotes characteristic descriptor data, 204 indicates a characteristic descriptor reliability calculating unit, 205 denotes data indicating a characteristic descriptor reliability, 206 indicates a retrieval-use-order-of-characteristic-descriptor determining unit, 207 denotes retrieval-use-order-of-characteristic-descriptor (search priority) data, 208 denotes information indicating a storing position of the compressed video data 201, and 209 indicates a for-retrieval description data producing unit.

Also, 210 denotes a for-retrieval description data file, 211 indicates a for-retrieval description data analyzing unit, 212 denotes characteristic descriptor data and the like analyzed in the for-retrieval description data analyzing unit 211, 213 indicates a conformity judgment processing unit, 214 denotes a processing result of the conformity judgment, 215 indicates a retrieval result coding and transmitting unit, 216 denotes retrieval request information, 217 denotes retrieval result information, 218 indicates a video reproducing server, 219 denotes reproduction request information, 220 indicates a reproduction control unit, 221 denotes reproduced contents specifying information, 222 denotes video contents data to be reproduced, 223 indicates a video data transmitting unit, and 224 denotes delivery video data.

Figure 16:
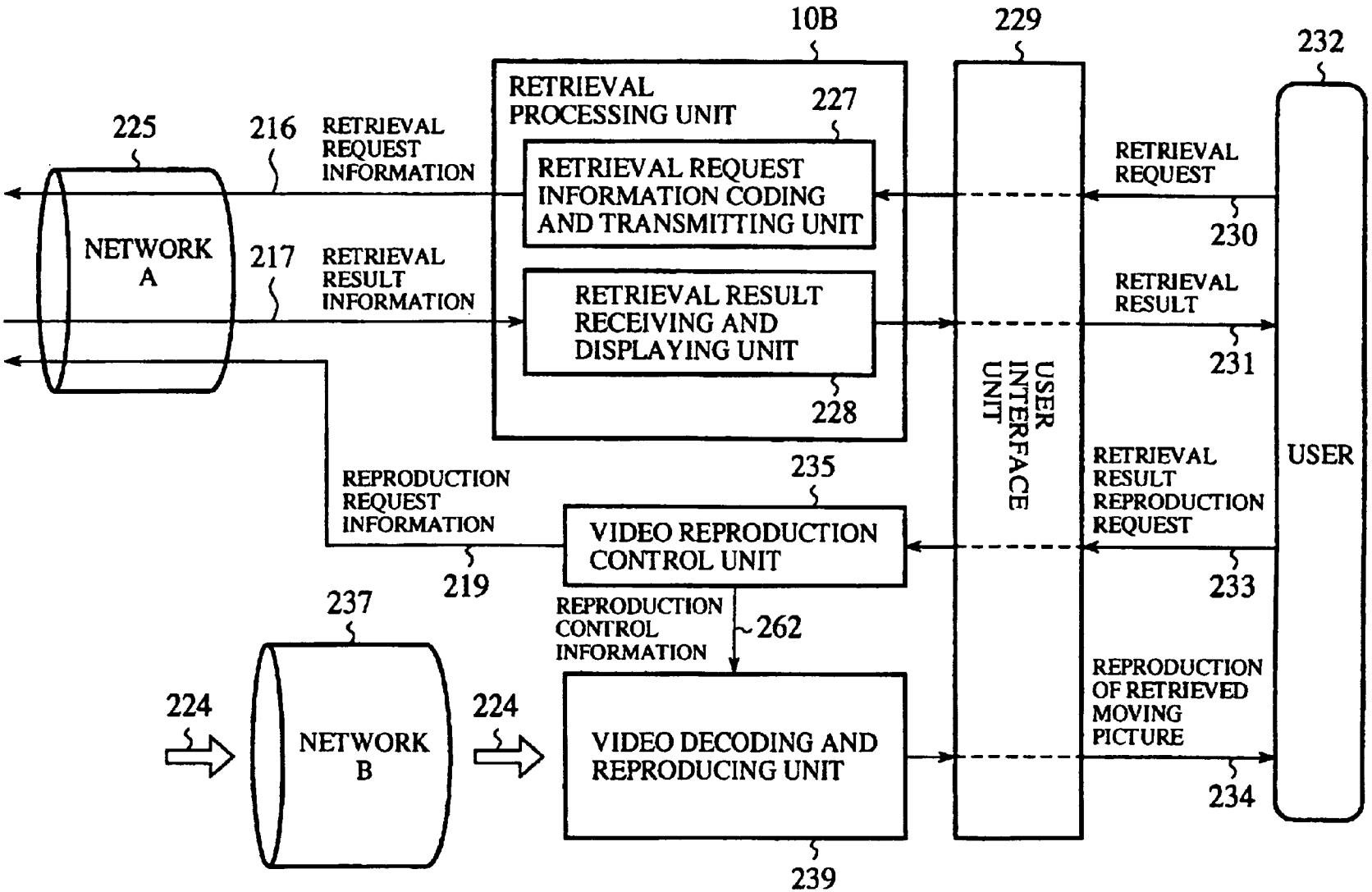
FIG. 16 is a block diagram showing the configuration of a characteristic portion placed on a client side of the image retrieval system according to the second embodiment.

FIG. 16 is a block diagram mainly showing the configuration of a characteristic portion placed on a client side of the image retrieval system according to the second embodiment. That is, the retrieval processing unit 10 shown in FIG. 2 is divided into the retrieval processing unit 10A and the retrieval processing unit 10B, and FIG. 16 shows a detailed block diagram of the retrieval processing unit 10B placed on the client side. Also, FIG. 16 shows a user interface arranged for both the interaction between a user and a video decoding and reproducing unit, in which a retrieval result is reproduced for the user, and the display of reproduced video data.

In FIG. 16, 225 indicates a network A, 227 indicates a retrieval request information coding and transmitting unit, 228 indicates a retrieval result receiving and displaying unit, 229 indicates a user interface unit, 230 denotes a retrieval request sent from a user, 231 denotes a retrieval result to be displayed in the user interface unit 229, 232 denotes a user, 233 denotes a retrieval result reproduction request, 234 denotes information indicating the reproduction of a retrieved moving picture, 235 indicates a video reproduction control unit, 237 indicates a network B, and 239 indicates a video decoding and reproducing unit.

Here, the retrieval request information 216, the retrieval result information 217, the reproduction request information 219 and the delivery video data 224 are transmitted and received among the retrieval processing unit 10B, the video reproduction control unit 235 and the video decoding and reproducing unit 239 shown in FIG. 16, and the retrieval processing unit 10A and the video reproducing server 218 shown in FIG. 15 through the networks A225 and B237. Here, the network A225 denotes a network in which the reliability in the data transfer is more important than a high speed data transfer. For example, the network A225 denotes a connection such as Transmission Control Protocol/Internet Protocol (TCP/IP). Also, the network B237 denotes a network in which a high speed data transfer for the real time transfer is more important than the reliability in the data transfer. For example, the network B237 denotes a connection such as Realtime Transport Protocol/User Datagram Protocol/Internet Protocol (RTP/UDP/IP).

Also, the user interface unit 229 shown in FIG. 16 corresponds to the client shown in FIG. 2, and the user interface unit 229 denotes a client application having the function of both the user interface unit 9 and the displaying unit 11.

Also, as is described above, the configuration shown in FIG. 15 denotes a component arranged on the server side, and the configuration shown in FIG. 16 denotes a component arranged on the client side. As is realized in FIG. 15 and FIG. 16, in the image retrieval system, the retrieval processing such as a retrieval conformity judgment processing is performed in the retrieval processing unit 10A arranged on the server side, request information indicating tastes of the user 232 in the retrieval processing is coded according to a prescribed rule on the client side, the request information is transmitted to the server, and the request information is analyzed in the server to reflect the request information on the retrieval processing.

Because the image retrieval system has the above-described server and client, it is not required to transmit a file, in which a large amount of video description data to be used for the retrieval is stored, to the client through the networks A225 and B237. Therefore, a network use efficiency can be heightened.

Also, as a normal presentation (or display) method of the retrieval result, candidates for the retrieval are generally presented to a user. However, all pieces of video data selected as candidates for the retrieval result information are not transferred to the client, but retrieval results really required by the user 232 can be transmitted to the client by combining the image retrieval system with a real time video reproduction system. Therefore, a total network use efficiency can be heightened.

The feature of the retrieval processing in the image retrieval system is that a numerical value indicating the reliability of the description of each type of video characteristic descriptor is calculated, the order of the types of video characteristic descriptors used for the retrieval is determined according to the numerical values, and the numerical values are stored in an XML file of for-retrieval description data as a part of the for-retrieval description data. Also, a specific descriptor indicating the order of the types of video characteristic descriptors used for the retrieval can be renewed according to a user's request input on the client side to reflect tastes of the user on the retrieval. Therefore, the specific descriptor functions as a descriptor which provides a parameter relating to the combination of a plurality of types of video characteristic descriptors in the retrieval.

Also, the numerical values indicating the reliability of the description of the types of video characteristic descriptors are used to determine a system parameter relating to the number of retrieval result candidates which is reduced in a step in which the video characteristic descriptors are used for the retrieval. Hereinafter, the specific descriptor indicating the order of the types of video characteristic descriptors used for the retrieval is call "search priority", and the numerical value indicating the reliability of the description of each type of video characteristic descriptor is called "degree of reliability". A detailed meaning and a use method of each of the search priority and the degree of reliability are a described later.

Figure 17:
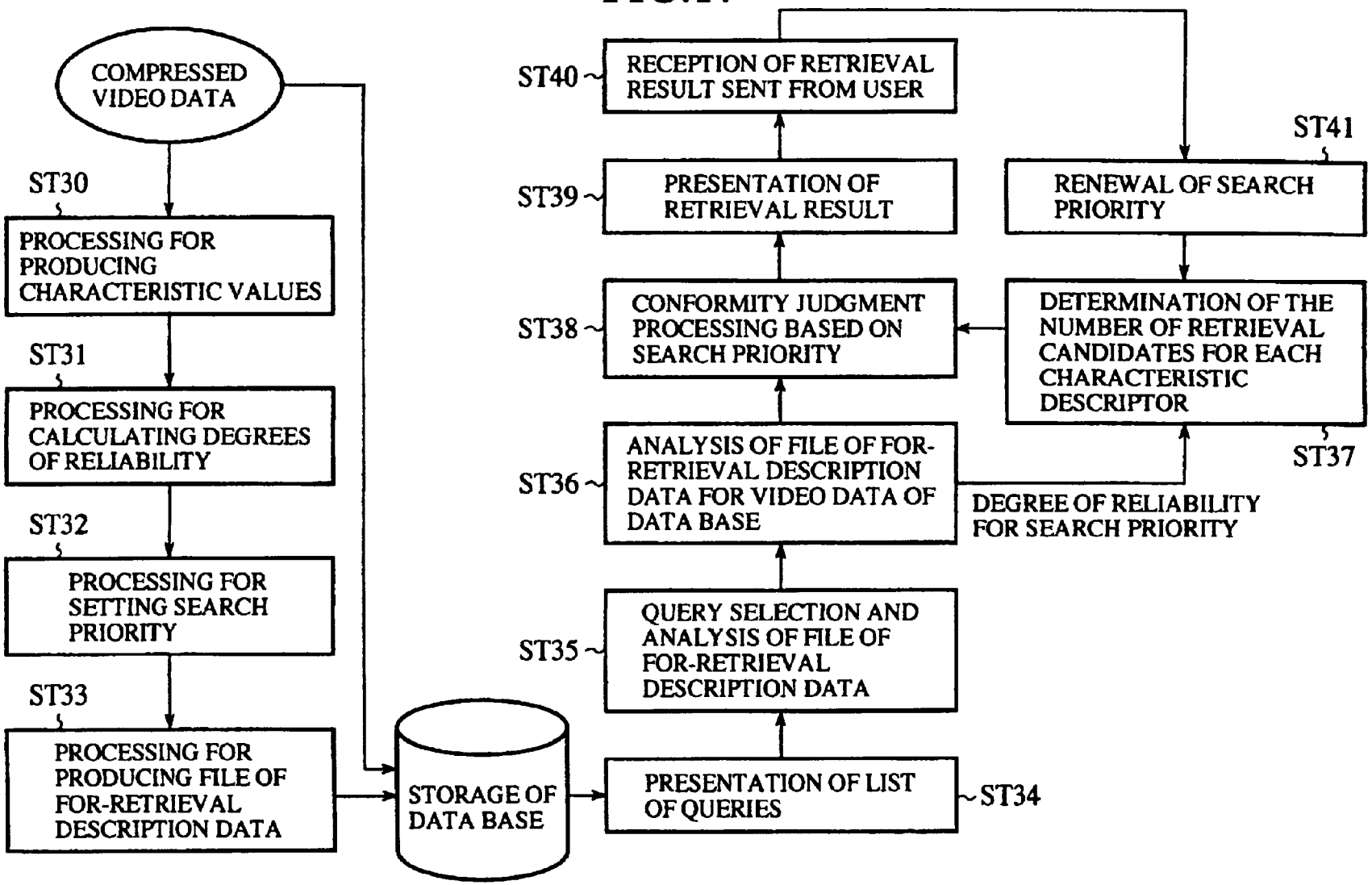
FIG. 17 is a flow chart showing a plurality of retrieval processing steps in the image retrieval system of the second embodiment.

FIG. 17 is a flow chart showing the production of for-retrieval description data and the retrieval processing in this image retrieval system. Hereinafter, an operation of the image retrieval system according to the second embodiment is described in detail with reference to FIG. 15 to FIG. 17.

(1) The Production of a For-retrieval Description Data File 210 (Step ST30 to Step ST33)

Initially, a processing described later is performed for compressed video data 201 which denotes input image data to be added as for-retrieval description data, and a for-retrieval description data file 210 is produced. Hereinafter, the compressed video data 201 relating to the production of the for-retrieval description data file 210 is called a video segment. As is described in the first embodiment, the video segment indicates a unit of video data composed of an arbitrary number of frames. Therefore, the video segment sometimes indicates one television program or one video software package. In this case, the television program and the video software package is respectively called "video program" equivalent to one video segment. Also, the video segment sometimes indicates one of scenes, which are obtained by dividing one television program according to the meaning indicated by the television program, or one of camera shots which are obtained by dividing each scene. In this case, the scene is called "video scene" sometimes equivalent to one video segment, and the camera shot is called "video shot" sometimes equivalent to one video segment. Therefore, the number of frames in one video program, the number of frames in one video scene and the number of frames in one video shot are different from each other.

(1-1) The Structure of For-retrieval Description Data

Figure 18:
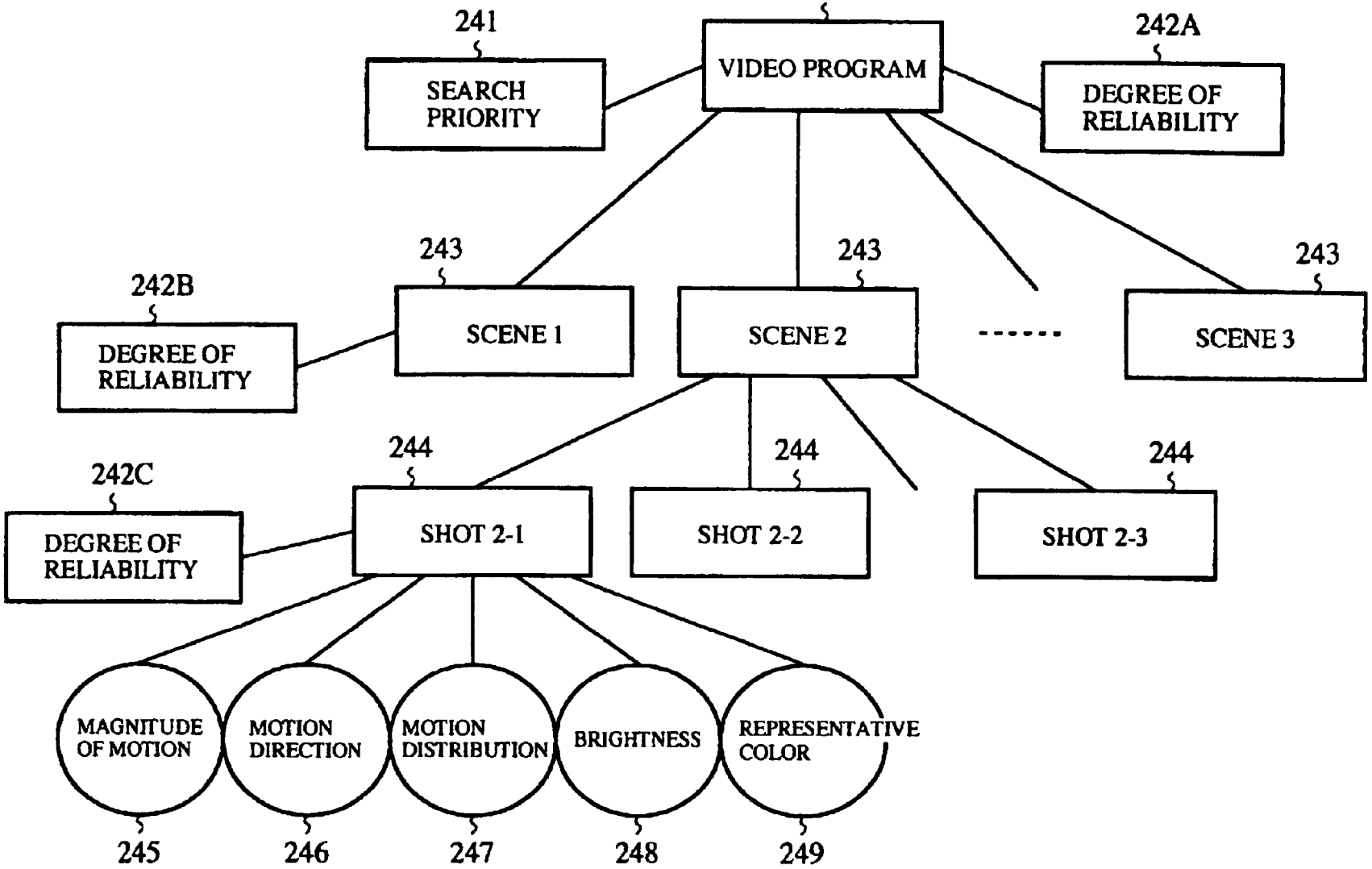
FIG. 18 is a diagram showing a structure of a for-retrieval description data file used by the image retrieval system of the second embodiment.

FIG. 18 is a diagram showing a structure of for-retrieval description data composing the for-retrieval description data file 210 in the second embodiment. In FIG. 18, in a structure of for-retrieval description data, a video program 240 is placed at the highest-ranking hierarchy, a group of video scenes 243 (abbreviated to "scene" in FIG. 18) composing the video program 240 is placed at a next hierarchy, and a group of video shots 244 (abbreviated to "shot" in FIG. 18) composing each video scene 243 is placed at the lowest-ranking hierarchy. Here, the video segment (the video program 240, the video scene 243 and the video shot 244), a search priority 241 and each degree of reliability 242 are indicated by "□", and each video segment, in particular, a group of characteristic descriptors 245 to 249 describing the video shot 244 is indicated by "○". In this image retrieval system, a set of characteristic descriptors 245 to 249 relating to each video shot 244 is produced.

1. Magnitude of Motion 245

The magnitude of motion 245 denotes a characteristic descriptor relating to a length of a motion vector in the video segment.

2. Motion Direction 246

The motion direction 246 denotes a characteristic descriptor relating to a direction of the motion vector in the video segment.

3. Motion Distribution 247

The motion distribution 247 denotes a characteristic descriptor relating to a distribution-in-screen of the motion vector in the video segment.

4. Brightness 248

The brightness 248 denotes a characteristic descriptor relating to an average brightness in the video segment.

5. Representative color 249

The representative color 249 denotes a characteristic descriptor relating to a representative color in the video segment.

Here, the degree of reliability 242 is set for each of the hierarchies 240, 243 and 244 and for each of the characteristic descriptors 245 to 249. Also, the search priority 241 is added to the video program arranged at the highest-ranking hierarchy.

In cases where the use order of the types of characteristic descriptors in the retrieval is changed, the retrieval result is changed. In this example, because a plurality of video segments well conforming to the user's retrieval request from a viewpoint of the magnitude of motion are selected when the data base is set to an initial state, it is expected that the retrieval result finally presented to the user is reliably most similar to the retrieval request from a viewpoint of the magnitude of motion. Therefore, because information of the use order in retrieval is provided for the video segments, the user can always obtain the retrieval result based on information of the search priority 241. Also, because the user can dynamically change the information of the search priority 241, the retrieval result corresponding to the intension of the user can be flexibly obtained.

Also, in the second embodiment, because it is supposed that one or more video shots 244 similar to a specific video shot 244 of the video program 240 are retrieved from the same video program 240, the search priority 241 is attached to only the video program 240, and the search priority 241 is not attached to the video segments corresponding to the hierarchies of the video scenes 243 and the video shots 244.

Next, the degree of reliability 242 set to each characteristic descriptor is described. For example, in case of the characteristic descriptor relating to the magnitude of motion, the degree of reliability 242 indicates how accurate the characteristic descriptor describes the magnitude of motion of video contents, and the degree of reliability 242 is objectively expressed by a numerical value. A method for expressing the degree of reliability 242 by a numerical value is described in detail when the production of various types of characteristic descriptors is described. In the second embodiment, the degree of reliability 242 is classified into a degree of reliability 242C which is calculated for each type of characteristic descriptor 245 to 249 of each video shot 244 and is attached to each video shot 244, a degree of reliability 242B which is attached to each video scene 243 and is set to the average of the degrees of reliability 242C of all video shots 244 composing the corresponding video scene 243, and a degree of reliability 242A which is attached to the video program 240 and is set to the average of values of the degrees of reliability 242B of all video scenes 243 composing the video program 240. The degrees of reliability 242 attached to the elements composing the for-retrieval description data are mainly used for an initial setting of the search priority 241 and a parameter setting in the retrieval processing. The use of the degrees of reliability 242 is described later in detail.

(1-2) The processing for Producing the For-retrieval Description Data (1-2-1) The Processing for Producing the Characteristic Descriptors (Step ST30)

In the production of each characteristic descriptor, an image characteristic value such as a motion vector or a value of the direct current component, which is required for the production of the characteristic descriptor, is extracted from the compressed video data 201 in the characteristic value extracting unit 3, and the characteristic descriptor is produced from the image characteristic value in the characteristic descriptor producing unit 202 (step ST30). Hereinafter, a method for producing each characteristic descriptor is described in detail.

(a) The Characteristic Descriptor 245 Relating to the Magnitude of Motion

An inter-frame (P-frame) denoting a k-th frame in a video segment is considered, and a length (or magnitude) $C_k[n]$ of a motion vector $MV_k[n]$ ($1 \leqq n \leqq N$, N denotes the number of macro-blocks placed in the frame) of each of all macro-blocks placed in the inter-frame is extracted.

$$C_k[n] = \sqrt{(x_n^2 + y_n^2)} \tag{7}$$

$x_n$: a lateral component of the motion vector $MV_k[n]$ $y_n$: a longitudinal component of the motion vector $MV_k[n]$ Thereafter, the average $C_k^{avg}$ and the variance $\sigma_k^2$ of the lengths $C_k[n]$ of the motion vectors corresponding to one frame are calculated.

$$C_k^{avg} = (1/N) * \sum_{n=1}^{N} C_k[n] \tag{8}$$

$$\sigma_k^2 = (1/N) * \sum_{n=1}^{N} (C_k[n] - C_k^{avg})^2 \tag{9}$$

As a result, a data set ($C_k^{avg}$, $\sigma_k^2$) of the characteristic descriptor relating to the magnitude of motion in the k-th inter-frame. In addition, to obtain the average of the lengths $C_k[n]$ of the motion vectors corresponding to one video segment, the average of the lengths $C_k[n]$ of the motion vectors is calculated by using the number of inter-frames in the video segment.

(b) The Characteristic Descriptor 246 Relating to the Motion Direction

A plurality of angles $A_k[n]$ of the motion vectors $MV_k[n]$ are calculated according to a following equation (10) for each inter-frame. The angles are expressed by a unit of "degree".

$$A_k[n] = \tan^{-1}(y_n / x_n) \tag{10}$$

In contrast, angles $A_k[n]=0$ are set for the macro-blocks of each intra-frame. The average of the angles $A_k[n]$ for the k-th inter-frame is calculated according to a following equation (11) for each inter-frame.

$$A_k^{avg} = (1/N) * \sum_{n=1}^{N} A_k[n] \tag{11}$$

In addition, the average of the angles $A_k[n]$ for one video segment is calculated by using the number of inter-frames in the video segment.

(c) The Characteristic Descriptor 247 Relating to the Motion Distribution

The threshold processing is performed for the lengths $C_k[n]$ of the motion vectors $MV_k[n]$ of each k-th inter-frame.

$$C'_k[n] = C_k[n]; \quad \text{if } C_k[n] \geqq C_k^{avg} \tag{12}$$

$$C'_k[n] = 0 \qquad \text{if } C_k[n] < C_k^{avg}$$

Thereafter, the values $C_k'[n]$ indicating a distribution of new motion vectors of each k-th inter-frame are scanned in the raster scan order, and values $SR_k$, $MR_k$ and $LR_k$ characterizing the motion distribution are calculated.

$SR_k$: the number of zero runs (that is, short runs) respectively having a length equal to or shorter than a length corresponding to ⅓ of the number of pixels serially arranged in the lateral direction of the frame $MR_k$: the number of zero runs (that is, middle runs) which respectively have a length higher than a length corresponding to ⅓ of the number of pixels serially arranged in the lateral direction of the frame and have a length shorter than a length corresponding to ⅔ of the number of laterally-arranged pixels $LR_k$: the number of zero runs (that is, long runs) respectively having a length equal to or higher than a length corresponding to ⅔ of the number of pixels serially arranged in the lateral direction of the frame Here, as is described in the first embodiment, as is realized in FIG. 8, the complexity of the motion is high in a frame in which many short runs exist, and the motion is distributed in a wide area of the frame. In contrast, the motion is localized in a frame in which many long runs exist.

Thereafter, the average of the values $SR_k$ for one video segment, the average of the values $MR_k$ for one video segment and the average of the values $LR_k$ for one video segment are calculated by using the number of inter-frames in the video segment.

(d) The Characteristic Descriptor 248 Relating to the Brightness

A histogram of direct current components included in luminance signals of the macro-blocks of one intra-frame is used for each intra-frame. In detail, each direct current component has a value ranging from 0 to 255, the total range of the value is classified into 16 sample-ranges by quantizing the values of the direct current components, and the number $H_i(j)$ of samples (that is, direct current components) corresponding to each sample-range is counted to obtain a histogram of direct current components for each i-th intra-frame. Thereafter, the average of the number $H_i(j)$ of samples of each sample-range for one video segment is calculated according to a following equation (13) by using the number N of intra-frames in the video segment.

$$H_{avg}(j) = (1/N) * \sum_{n=1}^{N} H_i(j),\ j = 0, K, 15 \tag{13}$$

(e) The Characteristic Descriptor 249 Relating to the Representative Color

A histogram of direct current components included in luminance and color difference signals of the macro-blocks of one intra-frame is used for each intra-frame. In detail, each direct current component has a value ranging from 0 to 255, the total range of the value is classified into 16 sample-ranges by quantizing the values of the direct current components, and the number $H_i^k(j)$ of samples (that is, direct current components) corresponding to each sample-range is counted to obtain a histogram of direct current components for each i-th intra-frame. Thereafter, the average of the number $H_i^k(j)$ of samples of each sample-range for one video segment is calculated according to a following equation (14) by using the number N of intra-frames in the video segment.

$$H_{avg}^k(j) = (1/N) * \sum_{i=1}^{N} H_i^k(j), \tag{14}$$

k: R, G or B in color space, j=0, K, 15

(1-2-2) The Processing for Calculating the Degree of Reliability (Step ST31)

Thereafter, the degree of reliability 242 (equivalent to the characteristic descriptor reliability 205 shown in FIG. 15) for each of the characteristic descriptors 245 to 249 calculated in the step ST30 is calculated in the characteristic descriptor reliability calculating unit 204 (step ST31). A calculating method for each of the characteristic descriptors 245 to 249 is described.

(a) The Characteristic Descriptor Relating to the Magnitude of Motion 245

The data set ($C_k^{avg}$, $\sigma_k^2$) of the characteristic descriptor relating to the magnitude of motion is extracted for each of all inter-frames of the video segment. Thereafter, the average of the data sets corresponding to the video segment is calculated by using the number of inter-frames of the video segment, an absolute value of a difference between the average of the data sets and the data set ($C_k^{avg}$, $\sigma_k^2$) corresponding to each inter-frame is calculated, the average of the differential absolute values corresponding to the inter-frames is calculated by adding the differential absolute values to each other, and the differential absolute values are normalized according to the average of the differential absolute values to set a maximum value among the differential absolute values to 0 and to set a minimum value among the differential absolute values to 100. The normalized differential absolute values indicate the description precision of the video segment on the basis of the description precision of the inter-frames. The degree of reliability for the characteristic descriptor 245 is indicated by the average of the degrees of reliability for the data sets ($C_k^{avg}$, $\sigma_k^2$) corresponding to the inter-frames.

(b) The Characteristic Descriptor Relating to the Motion Direction 246

The extraction of the angles $A_k^{avg}$ for all inter-frames of the video segment is performed. Thereafter, the average of the angles $A_k^{avg}$ corresponding to the video segment is calculated by using the number of inter-frames of the video segment, an absolute value of a difference between the average of the angles $A_k^{avg}$ and the angle $A_k^{avg}$ corresponding to each inter-frame is calculated, the average of the differential absolute values corresponding to the inter-frames is calculated by adding the differential absolute values to each other, and the differential absolute values are normalized according to the average of the differential absolute values to set a maximum value among the differential absolute values to 0 and to set a minimum value among the differential absolute values to 100. The normalized differential absolute values indicate the description precision of the video segment on the basis of the description precision of the inter-frames.

(c) The Characteristic Descriptor Relating to the Motion Distribution 247

The extraction of the value sets ($SR_k$, $MR_k$ and $LR_k$) for all inter-frames of the video segment is performed. Thereafter, the average of the value sets ($SR_k$, $MR_k$ and $LR_k$) corresponding to the video segment is calculated by using the number of inter-frames of the video segment, an absolute value of a difference between the average of the value sets ($SR_k$, $MR_k$ and $LR_k$) and the value set ($SR_k$, $MR_k$ and $LR_k$) corresponding to each inter-frame is calculated, the average of the differential absolute values corresponding to the inter-frames is calculated by adding the differential absolute values to each other, and the differential absolute values are normalized according to the average of the differential absolute values to set a maximum value among the differential absolute values to 0 and to set a minimum value among the differential absolute values to 100. The normalized differential absolute values indicate the description precision of the video segment on the basis of the description precision of the inter-frames. The degree of reliability for the characteristic descriptor 245 is indicated by the average of the degrees of reliability for the value sets ($SR_k$, $MR_k$ and $LR_k$) corresponding to the inter-frames.

(d) The Characteristic Descriptor Relating to the Brightness 248

An absolute value of a difference between the average histogram (composed of the numbers $H_{avg}(j)$ of samples in the sample-ranges) corresponding to the video segment and the histogram (composed of the numbers $H_i(j)$ of samples in the sample-ranges) corresponding to one inter-frame is calculated for each of all inter-frames of the video segment, the average of the differential absolute values corresponding to the inter-frames is calculated by adding the differential absolute values to each other, and the differential absolute values are normalized according to the average of the differential absolute values to set a maximum value among the differential absolute values to 0 and to set a minimum value among the differential absolute values to 100. The normalized differential absolute values indicate the description precision of the video segment on the basis of the description precision of the inter-frames. The degree of reliability for the characteristic descriptor 248 is indicated by the histograms corresponding to the inter-frames.

(e) The Characteristic Descriptor Relating to the Representative Color 249

An absolute value of a difference between the average color-space histogram (composed of the numbers $H_{avg}^k$ (j) of samples in the sample-ranges) corresponding to the video segment and the color-space histogram (composed of the numbers $H_i^k$ (j) of samples in the sample-ranges) corresponding to one inter-frame is calculated for each of all inter-frames of the video segment, the average of the differential absolute values corresponding to the inter-frames is calculated by adding the differential absolute values to each other, and the differential absolute values are normalized according to the average of the differential absolute values to set a maximum value among the differential absolute values to 0 and to set a minimum value among the differential absolute values to 100. The normalized differential absolute values indicate the description precision of the video segment on the basis of the description precision of the inter-frames. The degree of reliability for the characteristic descriptor 249 is indicated by the color-space histograms corresponding to the inter-frames.

(1-2-3) The Processing for Setting the Search Priority 241 (step ST32)

When the calculation of the characteristic descriptors 245 to 249 and the calculation of the degrees of reliability 242 for each of all video shots 244 included in the video program 240 are completed, an initial setting of the search priority 241 for the video program 240 is performed (step ST32). An initial setting method can be arbitrarily prescribed according to the design of the image retrieval system. However, in the second embodiment, an initial setting method is determined according to the degrees of reliability 242A for all characteristic descriptors 245 to 249 of the video program 240. The degree of reliability 242A for each characteristic descriptor "k" of the video program 240 is expressed by $\psi_k$, the degree of reliability 242B for each characteristic descriptor of the m-th video scene is expressed by $\psi_k(m)$, and the degree of reliability 242C for each characteristic descriptor of the n-th video shot of the m-th video scene is expressed by $\psi_k(m,n)$. In this case, a following relationship among $\psi_k$, $\psi_k(m)$ and $\psi_k(m,n)$ is satisfied.

$$\psi_k = (1/M) * \sum_{m=0}^{M-1} \psi_k(m) \tag{15}$$

$$\psi_k(m) = (1/N) * \sum_{n=0}^{N-1} \psi_k(m, n) \tag{16}$$

Therefore, as the degree of reliability $\psi_k$ for one type of characteristic descriptor "k" of the video program 240 is heightened, the contents description of the type of characteristic descriptor "k" in the video program 240 becomes better. Therefore, the search priority 241 is determined so as to use the characteristic descriptors 245 to 249 of the video program 240 in the retrieval in the order of decreasing the degree of reliability $\psi_k$.

(1-2-4) The Writing of the For-retrieval Descriptor Data File 210 (Step ST33)

After the above-described processing is performed, all characteristic descriptors 245 to 249 of the video program 240, the video scenes 243 and the video shots 244, the search priority 241, the degrees of reliability 242 are written in the for-retrieval description data producing unit 209 in the format of the XML file while relating to a space-time structure of the compressed video data 201 according to the structure shown in FIG. 18, and a for-retrieval description data file 210 is produced. Thereafter, the produced for-retrieval description data file 210 is output to the image information storing unit 5 and is stored (step ST33). Here, in this step, to make the user possible to refer to information which indicates video data from which the produced for-retrieval description data file 210 is produced, information 208 indicating a storing position of the compressed video data 201 is written in the format of the XML file to include the information 208 in the for-retrieval description data file 210, and the for-retrieval description data file 210 including the information 208 is output to the image information storing unit 5. Therefore, when the file 210 is analyzed, the position of the video data to be described can be specified.

(2) The Retrieval Processing

Next, the retrieval processing for a query (for example, a video shot specified on a retrieval request side) specified by a user on the client side is described in detail. The retrieval processing is performed by the retrieval processing unit 10A shown in FIG. 15 and the retrieval processing unit 10B shown in FIG. 16.

In the retrieval processing unit 10A, retrieval request information 216 transmitted from the client is analyzed, a query is specified, a prescribed retrieval result is obtained according to the conformity judgment processing in which the produced for-retrieval description data file 210 stored in the image information storing unit 5 is used, retrieval result information 217 is coded at a prescribed rule, and the retrieval result information 217 is sent to the client.

In the retrieval processing unit 10B, a retrieval request of the user is received through the user interface unit 229, the retrieval request is coded to the retrieval request information 216 according to a prescribed procedure, and the retrieval request information 216 is sent to the retrieval processing unit 10A. Also, the retrieval result information 217 sent from the server according to the prescribed rule is received, the format of the retrieval result information 217 is transformed to present the retrieval result information 217 to the user, and the retrieval result information 217 is displayed in the user interface unit 229.

In the second embodiment, a specific video shot 244 of the video program 240 described as shown in FIG. 18 is specified by the user as a video segment on the retrieval request side (or a query), and a video shot similar to the query is retrieved from the video program 240.

There are various methods for specifying the specific video shot denoting the query. For example, a plurality of video shots respectively usable as a retrieval key are registered as queries in advance when the video program 240 is produced, and the video shots usable as retrieval keys are presented to the user to make the user specify one video shot as a retrieval key. Also, as another example, when the user watches the reproduced video program 240, the user stops the reproduction of the video program 240 when a specific video shot of the video program 240 is displayed, and the user specifies the specific video shot as a query. Hereinafter, the retrieval processing performed after the specifying of the query is described in detail.

(2-1) The Specifying of the Query and the Analysis of the For-retrieval Description Data (Step ST34 to Step ST36)

The user initially selects a query as a retrieval request from a list of queries presented in the user interface unit 229 (step ST34).

In this embodiment, data of a plurality of key frames representing the video segment 240 as a plurality of query candidates is sent in advance from the image information storing unit 5 arranged on the server side and is presented in the form of a list of queries in the user interface unit 29.

In the retrieval processing unit 10B, retrieval request information 216 is sent from the retrieval request information coding and transmitting unit 227 to the retrieval processing unit 10A to specify the query specified by the user. In this case, the retrieval request information 216 is, for example, a number of a time series of numbers identifying the video program 240 and a specific video shot 244 of the video program 240 or data of an appropriate identifier. Also, the retrieval request information 216 denoting contents specifying information is described in advance in the for-retrieval description data file 210 as link information indicating the linking to specific contents. Therefore, it is applicable that the contents specifying information added to the list of queries be sent to the client to present the list of queries including the contents specifying information to the user.

Thereafter, in the retrieval processing unit 10A, the retrieval request information 216 sent from the retrieval processing unit 10B is received in the for-retrieval description data analyzing unit 211, the for-retrieval description data file 210 relating to a specific video shot 244 denoting the query is specified according to the received retrieval request information 216 in the for-retrieval description data analyzing unit 211, the for-retrieval description data file 210 is analyzed, and data of characteristic descriptors is extracted (step ST35).

Also, the search priority 241 of the video program 240, to which the query belongs, and data of the degrees of reliability 242B corresponding to each video scene 243 are extracted in advance in the for-retrieval description data analyzing unit 211 and are sent to the conformity judgment processing unit 213. Also, the data of the characteristic descriptors relating to the query is sent from the for-retrieval description data analyzing unit 211 to the conformity judgment processing unit 213. Thereafter, the for-retrieval description data files 210 corresponding to the video shots 244 of the video program 240, to which the query belongs, are analyzed one after another in the for-retrieval description data analyzing unit 211 and are sent to the conformity judgment processing unit 213 (step ST36).

Here, a structuring method of the for-retrieval description data files 210 is arbitrary determined. For example, it is applicable that for-retrieval description data of all video shots 244 of the video program 240 be stored in one for-retrieval description data file 210. Also, it is applicable that for-retrieval description data of each video shot 244 of the video program 240 be stored in one corresponding for-retrieval description data file 210. In cases where pieces of for-retrieval description data of all video shots 244 of the video program 240 are stored in a plurality of for-retrieval description data files 210 in one-to-one correspondence, it is required to include link information, which specifies the for-retrieval description data file 210 corresponding to each video shot 244, in the for-retrieval description data file 210 of the video program 240.

(2-2) The Determination of a Retrieval Rule and the Conformity Judgment Processing (Step ST37 to Step ST38)

The conformity judgment processing is performed in the conformity judgment processing unit 213 of the retrieval processing unit 10A, and the operation performed in the conformity judgment processing unit 213 is classified into the determination of a retrieval rule and the conformity judgment processing based on the characteristic descriptors.

(2-2-1) The Determination of a Retrieval Rule

Figure 19:
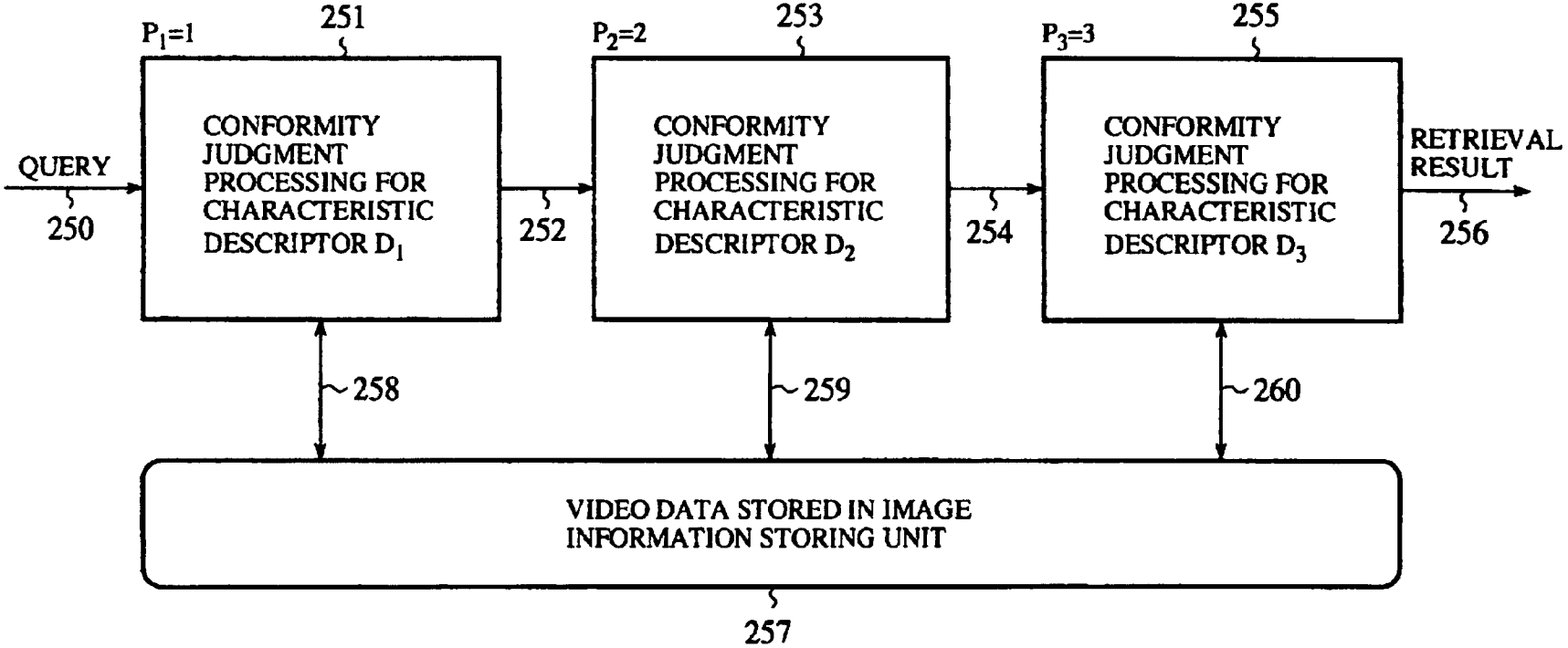
FIG. 19 is a diagram showing an example of a conformity judgment processing for judging the conformity of a characteristic descriptor according to a search priority in a conformity judgment processing unit.

In the conformity judgment processing unit 213, a retrieval rule and a parameter for the retrieval are set according to the search priority 241 of the video program 240 and data of the degrees of reliability 242B of the video scenes 243 received from the for-retrieval description data analyzing unit 211 (step ST37). In the second embodiment, as shown in FIG. 19, a use order of the characteristic descriptors 245 to 249 in the retrieval is determined as a retrieval rule according to the search priority 241, and a following retrieval parameter is determined according to the degrees of reliability.

(a) The Number of Retrieval Candidates for each Characteristic Descriptor in a Retrieval Step A final retrieval result number T sent to the user as a retrieval result is determined.

It is applicable that the final retrieval result number T be held in the image retrieval system as a default value, or it is applicable that the final retrieval result number T be set while being sent in the order of the user interface unit 229, the retrieval processing unit 10B and the retrieval processing unit 10A. In a retrieval engine, a retrieval result of a plurality of video shots 244, of which the number is equal to or lower than T, is obtained for each video scene 243, and a plurality of video shots 244, of which the number is T, are selected in the conformity judgment from all video shots 244 of all video scenes 243 selected as retrieval candidates, and the selected video shots 244 are sent to the user as a final retrieval result.

A retrieval candidate number $T_k$ in the retrieval for the m-th video scene 243 is determined according to the degree of reliability $\psi_k(m)$ for the m-th video scene 243.

$$T_0 = T * 5 \tag{17}$$

$$T_k = T_0 / P_k + [T * \{1 - (\psi_k(m)/100)\}]$$

Here, $P_k$ denotes a search priority ($1 \leqq P_k \leqq 5$) of the k-th ($1 \leqq k \leqq 5$) type of characteristic descriptor. Therefore, the retrieval candidate number $T_k$ of candidates in each retrieval step, in which the retrieval relating to one type of characteristic descriptor determined according to the search priority order is performed, is determined. Because the retrieval candidate number $T_k$ is basically reduced each time the retrieval step is performed, the retrieval processing can be performed at high speed. Also, because there is a possibility that a video shot 244 truly expected by the user is not selected in the above-described retrieval, it is applicable that the number of retrieval candidates in each retrieval step be set to a constant value and the degrees of reliability be used in the determination of final retrieval candidates.

(b) The Retrieval Skip Judgment Based on the Threshold Processing

In case of the conformity judgment processing for each video shot 244, a video shot, in which the degree of reliability for the characteristic descriptor ranked to the highest search priority is extremely low so as to satisfy a condition of a following equation, is not selected as a candidate for the conformity judgment processing because it is regarded that the video shot does not satisfies the retrieval condition. Because the reliability becomes low as the degree of reliability approaches 0 and because the reliability becomes high as the degree of reliability approaches 100, a parameter TH in the following equation (18) is appropriately set to a low value.

$$\psi_k(m, n) < TH;\ P_k = 1 \tag{18}$$

In this judgment based on the equation (18), any video shot, which is not proper as a retrieval result candidate, can be removed from the retrieval result candidates before the performance of the conformity judgment processing, and the retrieval processing can be performed at high speed.

Here, in the explanation of the second embodiment, the characteristic descriptor ranked to the highest search priority is used for the judgment based on the equation (18). However, other various skip judgment methods using the degree of reliability can be performed. Also, this judgment of the second embodiment is performed each time the conformity judgment processing for one video shot 244 is performed.

(2-2-2) The Conformity Judgment Processing for each Characteristic Descriptor

The conformity judgment processing is performed, according to following standards, for the characteristic descriptor determined according to the search priority 241 in each retrieval step (step ST38).

(a) Type of Characteristic Descriptors Relating to the Magnitude of Motion

A Euclidean distance between each pair of pieces of for-retrieval description data relating to the magnitude of motion is calculated, and the Euclidean distances for all pairs are added to each other. To reduce differences in the values of the Euclidean distances, the normalizing processing is performed for the Euclidean distances. The query is expressed by $S_q$, the video shot to be retrieved is expressed by S, and a degree $D(S_q, S)$ of the matching estimation between the query $S_q$ and the video shot S is determined according to following equations (19). As the degree $D(S_q, S)$ is decreased, the degree of similarity between the query $S_q$ and the video shot S is heightened, and it is judged that the video shot S conforms with the query $S_q$.

$$W = C^{avg}(S_q) + \sigma^2(S_q)$$

$$D(S_q, S) = (W/C^{avg}(S_q)) * |C^{avg}(S_q) - C^{avg}(S)| + (W/\sigma^2(S_q)) * |\sigma^2(S_q) - \sigma^2(S)| \quad (19)$$

(b) Type of Characteristic Descriptors Relating to the Motion Direction

A degree $D(S_q, S)$ of the matching estimation between the query $S_q$ and the video shot S is determined according to a following equation (20). As the degree $D(S_q, S)$ is decreased, the degree of similarity between the query $S_q$ and the video shot S is heightened, and it is judged that the video shot S conforms with the query $S_q$.

$$D(S_q, S) = |A^{avg}(S_q) - A^{avg}(S)| \quad (20)$$

(c) Type of Characteristic Descriptors Relating to the Motion Distribution

A degree $D(S_q, S)$ of the matching estimation between the query $S_q$ and the video shot S is determined according to a following equation (21). As the degree $D(S_q, S)$ is decreased, the degree of similarity between the query $S_q$ and the video shot S is heightened, and it is judged that the video shot S conforms with the query $S_q$.

$$D(S_q, S) = |SR(S_q) - SR(S)| + |MR(S_q) - MR(S)| + |LR(S_q) - LR(S)| \quad (21)$$

(d) Type of Characteristic Descriptors Relating to the Brightness

A degree $D(S_q, S)$ of the matching estimation between the query $S_q$ and the video shot S is determined according to a following equation (22). Here, $H_i(S)$ denotes the number of samples in the i-th sample-range. As the degree $D(S_q, S)$ is decreased, the degree of similarity between the query $S_q$ and the video shot S is heightened, and it is judged that the video shot S conforms with the query $S_q$.

$$D(S_q, S) = \sum_{i=0}^{15} |H_i(S_q) - H_i(S)| \quad (22)$$

(e) Type of Characteristic Descriptors Relating to the Representative Color

A degree $D(S_q, S)$ of the matching estimation between the query $S_q$ and the video shot S is determined according to a following equation (22). Here, $H_i^R(S)$ $H_i^G(S)$ and $H_i^B(S)$ respectively denote the number of samples in the i-th sample-range. As the degree $D(S_q, S)$ is decreased, the degree of similarity between the query $S_q$ and the video shot S is heightened, and it is judged that the video shot S conforms with the query $S_q$.

$$D(S_q, S) = \sum_{i=0}^{15} |H_i^R(S_q) - H_i^R(S)| + |H_i^G(S_q) - H_i^G(S)| + |H_i^B(S_q) - H_i^B(S)| \quad (23)$$

An example of the conformity judgment processing for a characteristic descriptor determined according to the search priority 242 in the conformity judgment processing unit 211 is shown in FIG. 19. For example, there are three types of character descriptors $D_1$ to $D_3$ in the video segment 240. The search priority $P_k$ (k denotes a natural number) denotes the use order of the character descriptors $D_1$ to $D_3$ in the retrieval. For example, $D_1$ denotes the type of character descriptor relating to the magnitude of motion, $D_2$ denotes the type of character descriptor relating to the motion distribution, and $D_3$ denotes the type of character descriptor relating to the brightness. In the example of FIG. 19, in the conformity judgment processing unit 213, the conformity judgment processing 251 is first performed for a query (or a video shot specified on the retrieval request side) 250 by using the character descriptor $D_1$ relating to the magnitude of motion, and pieces of video segment data 252, which are highly similar to the query and well conforms with the query from a viewpoint of the magnitude of motion, are narrowly selected from a large number of pieces video data 257 stored in the image information storing unit 5 which is sent from the for-retrieval description data analyzing unit 211. Thereafter, the conformity judgment processing 253 is performed for the pieces of selected video segment data 252 by using the character descriptor D2 relating to the motion distribution, and pieces of video segment data 254, which are highly similar to the query and well conforms with the query from a viewpoint of the motion distribution, are narrowly selected from the pieces of selected video segment data 252. Thereafter, the conformity judgment processing 255 is performed for the pieces of selected video segment data 254 by using the character descriptor $D_3$ relating to the brightness, and pieces of video segment data, which are highly similar to the query and well conforms with the query from a viewpoint of the brightness, are narrowly selected as a final retrieval result 256 (equivalent to the conformity judgment processing result 214 shown in FIG. 15) from the pieces of selected video segment data 254.

(2-3) The Presentation of the Final Retrieval Result and the Re-retrieval Based on the User's Feed Back (Step ST39 to Step ST41)

Information of T video shots, which are selected as the final retrieval result 256 according to the above-described retrieval rule and the conformity judgment processing, is presented to the user 232 in the user interface unit 229 (step ST39). The presenting method is arbitrary determined. In the second embodiment, a query list is first presented. That is, key frame data representing the video shots of the retrieval result or attribute information (for example, a name of a subject in each video shot) of the video shots is coded according to a prescribed rule and is sent to the retrieval processing unit 10B arranged on the client side as retrieval result information 217, the retrieval result information 217, which is obtained by coding the key frame data or the attribute information and is sent from the server, is received in the retrieval result receiving and displaying unit 228, the format of the retrieval result information 217 is transformed so as to be displayed in the user interface unit 229, and the retrieval result information 217 is sent to the user interface unit 229. Therefore, the user 232 can watch the retrieval result 256 shown in the user interface unit 229.

Next, the procedure of the re-retrieval based on the user's feed back is described.

The user first ascertains the retrieval result 256 obtained according to the retrieval rule which is determined according to the search priority 241 and the degrees of reliability 242. However, there is a possibility that the retrieval result 256 differs from that subjectively expected by the user 232. To flexibly solve this problem, in the second embodiment, the image retrieval system has a function in which the user 232 changes the search priority 241 and the re-retrieval can be performed according to the changed search priority (step ST40).

The relationship between a subjective meaning particularly desired by the user to be remarked and a characteristic descriptor is shown in FIG. 20. As is realized in FIG. 20, in cases where the user 232 selects a specific video shot, in which a specific subject is moved in a certain direction, as a query, there is a high possibility that the user 232 expects a video shot which is similar to the specific video shot in the characteristic of the motion direction. However, because the search priority 241 is determined according to the degrees of reliability initially set, there is a probability that a weighting value determined according to the user's subjective meaning is not reflected on the retrieval processing.

Therefore, to make the user 232 possible to reflect subjective meanings shown in FIG. 20 on the retrieval processing, the image retrieval system has a function in which the user 232 can change the search priority 241 through the user interface unit 229. For example, in the above-described example, it is possible that the user 232 sets the search priority relating to the type of characteristic descriptor of the motion direction to a higher value. Therefore, the conformity judgment processing for the type of characteristic descriptors relating to the motion direction is preferentially performed in the retrieval processing, and the condition of the motion direction can be strongly reflected on the final retrieval result 256.

The search priority 241 renewed by the user 232 is coded according to the prescribed rule in the retrieval request information coding and transmitting unit 227, and the search priority 241 is sent as a part of the retrieval request information 216 to the for-retrieval description data analyzing unit 211 of the retrieval processing unit 10A of the server side through the network A 225.

In the for-retrieval description data analyzing unit 211, to reuse the renewed value of the search priority 241 in the following retrieval processing, the value of the search priority 241 corresponding to the video program 240 of the for-retrieval description data file 210 is updated to the renewed value (step ST41).

Also, in the for-retrieval description data analyzing unit 211, when the retrieval processing is completed, the for-retrieval description data file 210, in which the value of the search priority 241 is updated to the renewed value, is again stored in the image information storing unit 5.

Because the image retrieval system has the function for renewing the search priority 241 and storing the renewed search priority 241, in cases where the user 232 again searches the same video program 240 in the same standards, the user 232 can retrieve desired video data on condition that the subjective request of the user 232 performed in the past is reflected on the retrieval processing.

Also, in cases where a plurality of users 232 use the same image retrieval system, it is applicable that the for-retrieval description data file 210 be divided into a plurality of data files so as to store the search priority 241 relating to each user 232 in the corresponding data file. Therefore, the retrieval rule appropriate to each user 232 can be appropriately reused by adding a function of an appropriate user authentication processing to the image retrieval system.

Therefore, the re-retrieval is performed by repeatedly performing the retrieval processing in the step ST37 to step ST41 while using the renewed search priority 241, and the production of the for-retrieval descriptor data and the retrieval processing in the image retrieval processing shown in FIG. 17 is completed.

(3) The Processing for Reproducing Video Shot

In the above-described operation, the user can extract a desired retrieval result to the use interface unit 229. However, a plurality of retrieval candidates are generally presented according to the retrieval result, and it is required to transfer a large amount of information from the server to the client to display the retrieval candidates in the form of the video data. Therefore, as is described above, in the image retrieval system, data such as a plurality of key frames representing the video shots of the retrieval result is presented to the user 232 in the user interface unit 229, and a desired video shot selected by the user can be reproduced. Therefore, a total amount of transferred information can be effectively reduced. To achieve the reduction of a total amount of transferred information in the image retrieval system, in the second embodiment, the video reproducing server 218, the video decoding and reproducing unit 239 and the video reproduction control unit 235 shown in FIG. 15 or FIG. 16 are arranged. The user 232 uses the above-described function to reproduce the selected video shot 244 or the selected video program 240.

Next, the reproduction operation of the video shot 244 or the video program 240 selected by the user 232 using the above-described function is described.

When the user 232 selects a video shot 244 or a video program 240, which is desired to be reproduced, according to a plurality of key frames presented to the user 232 in the user interface unit 229, selection information is output as retrieval result reproduction request 233 from the user interface unit 229 to the video reproduction control unit 235.

In the video reproduction control unit 235, the retrieval result reproduction request 233 is transformed into reproduction request information 219 according to a prescribed procedure and is sent to the reproduction control unit 220 of the video reproduction server 218 of the server through the network A225.

In the reproduction control unit 220, reproduced contents specifying information 221, in which contents specifying information indicating the specifying of contents is included, is produced from the reproduction request information 219. In this case, it is preferred that the reproduced contents specifying information 221 including the contents specifying information be described in the for-retrieval description data file 210 in advance as link information indicating the linking to contents, the contents specifying information be added to retrieval result information 217 when the retrieval result information 217 is presented to the user 232, the contents specifying information be sent to the client, and the contents specifying information be used as the reproduction request information 219.

Thereafter, in the reproduction control unit 220, the reproduced contents specifying information 221 produced according to the received reproduction request information 219 is sent to the image information storing unit 5, video contents data 222 to be reproduced is specified in the image information storing unit 5, and the specified video contents data 222 to be reproduced is sent to the video data transmitting unit 223.

In the video data transmitting unit 223, the video contents data 222 to be reproduced is transformed into delivery video data 224 which has a data format possible to be delivered at real time, and the delivery video data 224 is sent to the network B237.

Here, it is applicable that the transformation of the data format be performed in the video data transmitting unit 223 to make the client or the network B237 possible to obtain the reliability when video data is sent from the video data transmitting unit 223 to the network B237 in which the high speed transmission is set as an important function. For example, video data is divided into a plurality of video frames, and a time stamp is added to each video frame. Also, priority information is added to each packet denoting a transfer unit.

Also, in the client, the delivery video data 224 sent through the network B237 is received in the video decoding and reproducing unit 239, and the delivery video data 224 is reproduced according to control information 262, which is required for the reproduction and is sent from the video reproduction control unit 235, to be displayed on the user interface unit 229. In cases where the reliability of transferred data is lowered because of a problem in the data transfer, a quality management control is appropriately performed in the video decoding and reproducing unit 239 and the video reproduction control unit 235 to heighten the reproduction quality of the transferred data.

As is described above, in the image retrieval system and the image retrieval method according to the second embodiment, a server-client type system configuration is adopted. Therefore, the video data can be efficiently retrieved and delivered in the distributed network environment such as IP network as well as in the local environment.

Also, the search priority 241 and the degree of reliability 242 are stored in the image information storing unit 5 as the for-retrieval description data. Therefore, the determination course of the common retrieval rule can be determined according to the values of the search priority 241 and the degrees of reliability 242 in the image retrieval system.

Also, because the image retrieval system has the function for renewing the search priority 241, the user can preferentially performs the retrieval based on the subjective meaning of the video contents.

In addition, because the image retrieval system has the function of the skip control in the conformity judgment processing based on the degrees of reliability of the characteristic descriptors, the retrieval processing can be performed at high speed, and a system efficiency can be improved.

In the first and second embodiments, the video data is processed as media data. However, the present invention is not limited to the video data. For example, it is applicable that video data, to which speech/audio data is added, be processed in the image retrieval system. Also, it is applicable that another retrieval system based on characteristic descriptors be prepared for the audio data in the image retrieval system. Also, it is applicable that the retrieval for audio data be not performed in the image retrieval system because the audio data is merely attached to the video data. Also, in cases where audio data is added to the video data, it is applicable that the reproduction of the audio data attached to and synchronized with the video data be supported in the video shot reproduction processing in the image retrieval system.

Also, in the image retrieval system described in the second embodiment, it is not necessarily required that a module, which is composed of the characteristic value extracting unit 3 and the characteristic descriptor set producing unit 4, for producing data of characteristic descriptors, a module of a retrieval engine, which has the retrieval processing unit 10A, for performing the retrieval in response to a retrieval request of the user and sending a retrieval result to the user and a client module, which is mainly composed of the retrieval processing unit 10B, for sending a retrieval request of the user to the retrieval engine and presenting a retrieval result sent from the retrieval engine to the user are arranged in the same hardware at the same software. That is, it is applicable that the modules be respectively arranged in a certain hardware at a certain software according to a predetermined interface. Also, for example, from a viewpoint of service, it is applicable that a contents provider produce data of characteristic descriptors and apply for the data base registration of the characteristic descriptors, a retrieval service provider register the characteristic descriptors in a data base to make preparations for the retrieval processing, the user specify a retrieval service provider as is described in the second embodiment or the user perform the retrieval by using a client tool in which the retrieval processing is performed according to standard prescriptions.

As is described above, in the image retrieval system and the image retrieval method according to the present invention, characteristic values and pieces of attribute information are extracted from pieces of image data, and the retrieval of specific image data is performed by using the extracted characteristic values and the attribute information. Therefore, the image retrieval processing can be efficiently performed.

What is claimed is:

1. An image retrieval system, comprising:

a characteristic descriptor producing unit for extracting a plurality of image characteristic values from pieces of input image data and producing a characteristic descriptor for each piece of input image data;

an image information storing unit for storing the characteristic descriptors produced in the characteristic descriptor producing unit while holding the correspondence of each characteristic descriptor to one piece of input image data;

an attribute list producing unit for producing an attribute list according to a piece of attribute information attached to each piece of input image data; and an image retrieving unit for receiving a first retrieval condition relating to attribute information, searching the attribute list produced in the attribute list producing unit for one piece of attribute information conforming to the first retrieval condition, outputting the piece of attribute information conforming to the first retrieval condition, receiving a second retrieval condition relating to a characteristic descriptor, searching the image information storing unit for one piece of image data conforming to the second retrieval condition, and outputting the piece of image data conforming to the second retrieval condition.

2. An image retrieval system according to claim 1, wherein the attribute list is produced according to a syntax, which defines a data structure of the attribute list, in the attribute list producing unit, the attribute list is analyzed according to the syntax of the attribute list in the image retrieving unit, and the piece of attribute information conforming to the first retrieval condition is retrieved in the image retrieving unit.

3. An image retrieval system according to claim 1, wherein the characteristic descriptors are produced according to a syntax, which defines a data structure of each characteristic descriptor, in the characteristic descriptor producing unit, the characteristic descriptors are analyzed according to the syntax of the characteristic descriptors in the image retrieving unit, and the piece of image data conforming to the second retrieval condition is retrieved in the image retrieving unit.

4. An image retrieval system according to claim 1, wherein one image characteristic value is extracted in the characteristic descriptor producing unit for each frame, and one characteristic descriptor is produced in the characteristic descriptor producing unit for each video segment composed of a group of frames.

5. An image retrieval system according to claim 4, wherein each piece of input picture data received in the characteristic descriptor producing unit denotes compressed video data which composes one or more intra-frames and one or more inter-frames, both an average value and a standard deviation are produced as one characteristic descriptor of the intra-frames of the video segment in the characteristic descriptor producing unit by extracting an average matrix of pixel values in a prescribed coding area of one intra-frame for each intra-frame of the video segment, calculating a sum of the average matrices of all intra-frames included in the video segment and calculating both the average value of the average matrices and the standard deviation of the average matrices from the sum and the number of intra-frames in the video segment, and one characteristic descriptor of the inter-frames of the video segment is produced in the characteristic descriptor producing unit by extracting a matrix of motion vectors of pixels of the prescribed coding areas of one inter-frame for each inter-frame of the video segment, calculating an average of the motion vectors of each inter-frame of the video segment as a motion vector average, classifying zero run lengths, which are obtained according to a threshold processing for the motion vectors of one inter-frame, into a plurality of classified types of zero run lengths for each inter-frame of the video segment, calculating an average of the motion vector averages and a plurality of classified types of average zero run lengths in the video segment according to the number of inter-frames in the video segment and setting the average of the motion vector averages and the classified types of average zero run lengths as the characteristic descriptor of the inter-frames of the video segment.

6. An image retrieval system according to claim 1, wherein each piece of input picture data received in the characteristic descriptor producing unit denotes non-compressed video data, the characteristic values are extracted from the pieces of non-compressed video data in the characteristic descriptor producing unit to produce the characteristic descriptors, and the characteristic descriptors and pieces of compressed video data, which are obtained by compressing the pieces of non-compressed video data according to a prescribed video compression method, are stored in the image information storing unit while the correspondence of each characteristic descriptor to one piece of compressed video data is held.

7. An image retrieval system according to claim 1, wherein a prescribed condition equation stored in advance is read out by the image retrieving unit in cases where the image retrieving unit searches the image information storing unit for the piece of image data conforming to the characteristic descriptor specified by the second retrieval condition to output the piece of image data, and it is judged according to the prescribed condition equation whether or not the piece of image data conforms to the characteristic descriptor specified by the second retrieval condition.

8. An image retrieval system according to claim 1, wherein each piece of input image data denotes a monitored image recorded by a monitoring camera.

9. An image retrieval system according to claim 1, wherein each piece of input image data denotes an image of a stored video mail.

10. An image retrieval system according to claim 1, wherein each piece of input image data denotes an image of a stored broadcast program.

11. An image retrieval system according to claim 1, wherein each piece of input image data denotes a video image recorded by a video camera.

12. An image retrieval method, comprising the steps of:

extracting a plurality of image characteristic values from pieces of input image data to produce a characteristic descriptor for each piece of input image data;

storing the produced characteristic descriptors while holding the correspondence of each characteristic descriptor to one piece of input image data;

producing an attribute list according to a piece of attribute information attached to each piece of input image data;

receiving a first retrieval condition relating to attribute information;

searching the attribute list for one piece of attribute information conforming to the first retrieval condition;

outputting the piece of attribute information conforming to the first retrieval condition;

receiving a second retrieval condition relating to a characteristic descriptor;

searching the pieces of stored image data for one piece of image data conforming to the second retrieval condition while referring to the piece of attribute information conforming to the first retrieval condition; and outputting the piece of image data conforming to the second retrieval condition.

13. An image retrieval system, comprising:

a characteristic descriptor producing unit for extracting a plurality of image characteristic values from pieces of input image data and producing a characteristic descriptor for each piece of input image data;

a for-retrieval description data producing unit for describing each characteristic descriptor as a piece of for-retrieval description data while holding the correspondence of the piece of for-retrieval description data to a space-time structure of the pieces of input image data;

an image information storing unit for storing each piece of for-retrieval description data with the piece of input image data corresponding to the piece of for-retrieval description data;

a first retrieval processing unit;

a second retrieval processing unit; and a user interface unit, wherein a retrieval request received from a user through the user interface unit is sent from the second retrieval processing unit to the first retrieval processing unit as retrieval request information, a retrieval result sent from the first retrieval processing unit is received in the second retrieval processing unit, the second retrieval processing unit presents the retrieval result to the user through the user interface unit, the pieces of for-retrieval description data of the pieces of input image data stored in the image information storing unit are analyzed in the first retrieval processing unit according to the retrieval request information sent from the second retrieval processing unit to extract the characteristic descriptors, a conformity judgment processing is performed in the first retrieval processing unit according to the extracted characteristic descriptors to obtain the retrieval result, and the retrieval result is sent from the first retrieval processing unit to the second retrieval processing unit to make the second retrieval processing unit present the retrieval result to the user through the user interface unit.

14. An image retrieval system according to claim 13, further comprising:

a characteristic descriptor reliability calculating unit for calculating a degree of reliability of each characteristic descriptor produced in the characteristic descriptor producing unit, wherein the for-retrieval description data producing unit describes each characteristic descriptor and the degree of reliability of the characteristic descriptor as one piece of for-retrieval description data while holding the correspondence of the piece of for-retrieval description data to the space-time structure of the pieces of input image data, the pieces of for-retrieval description data of the pieces of input image data stored in the image information storing unit are analyzed in the first retrieval processing unit according to the retrieval request information sent from the second retrieval processing unit to extract the characteristic descriptors and the degrees of reliability of the characteristic descriptors, a conformity judgment processing is performed in the first retrieval processing unit according to the extracted characteristic descriptors and the degrees of reliability of the characteristic descriptors to obtain the retrieval result, and the retrieval result is sent from the first retrieval processing unit to the second retrieval processing unit to make the second retrieval processing unit present the retrieval result to the user through the user interface unit.

15. An image retrieval system according to claim 14, wherein the necessity of the conformity judgment processing for each characteristic descriptor is estimated in the first retrieval processing unit according to the degree of reliability of the characteristic descriptor in case of the conformity judgment processing, and the conformity judgment processing for the characteristic descriptor is skipped in cases where it is judged that the conformity judgment processing for the characteristic descriptor is not necessary.

16. An image retrieval system according to claim 14, further comprising:

a characteristic descriptor retrieval order determining unit for determining a use order of the characteristic descriptors in the retrieval according to the degrees of reliability calculated in the characteristic descriptor reliability calculating unit, wherein the for-retrieval description data producing unit describes each characteristic descriptor, the degree of reliability of the characteristic descriptor and the use order in the retrieval as one piece of for-retrieval description data while holding the correspondence of the piece of for-retrieval description data to the space-time structure of the pieces of input image data, the pieces of for-retrieval description data of the pieces of input image data stored in the image information storing unit are analyzed in the first retrieval processing unit according to the retrieval request information sent from the second retrieval processing unit to extract the characteristic descriptors, the degrees of reliability of the characteristic descriptors and the use order in the retrieval, a conformity judgment processing is performed in the first retrieval processing unit according to the extracted characteristic descriptors, the degrees of reliability and the use order in the retrieval to obtain the retrieval result, and the retrieval result is sent from the first retrieval processing unit to the second retrieval processing unit to make the second retrieval processing unit present the retrieval result to the user through the user interface unit.

17. An image retrieval system according to claim 13, wherein the retrieval request information, in which a use order of the characteristic descriptors in the retrieval, is sent from the second retrieval processing unit to the first retrieval processing unit as the retrieval request sent from the user through the user interface unit, and a retrieval order of the characteristic descriptors is renewed in the first retrieval processing unit according to the use order in the retrieval which is included in the retrieval request information sent from the second retrieval processing unit to perform a retrieval processing corresponding to the retrieval request of the user.

18. An image retrieval system according to claim 16, wherein the number of characteristic descriptor candidates in the retrieval result obtained in the conformity judgment processing is determined according to the degrees of reliability of the characteristic descriptors in the first retrieval processing unit for each of a plurality of retrieval steps of which an applied order is determined according to the use order in the retrieval, and the conformity judgment processing is performed.

19. An image retrieval system according to claim 17, wherein the number of characteristic descriptor candidates in the retrieval result obtained in the conformity judgment processing is determined according to the degrees of reliability of the characteristic descriptors in the first retrieval processing unit for each of a plurality of retrieval steps of which an applied order is determined according to the use order in the retrieval, and the conformity judgment processing is performed.

20. An image retrieval system according to claim 13, further comprising:

a video data reproducing server; and a video data decoding and reproducing unit, wherein each piece of input image data denotes a piece of video data, a piece of key image data representing each of pieces of video data specified in the retrieval is sent from the first retrieval processing unit to the second retrieval processing unit as the retrieval result, each piece of key image data is received in the second retrieval processing unit as the retrieval result sent from the first retrieval processing unit to present the retrieval result to the user through the user interface unit, a reproduction request indicating a specific key image, which is selected by the user from a plurality of key images indicated by the pieces of key image data, is sent from the user interface unit and is received in the video data reproducing server, a piece of specific video data represented by the specific key image is read out from the image information storing unit and is sent to the video data decoding and reproducing unit, and the piece of specific video data sent from the video data reproducing server is received in the video data decoding and reproducing unit, is decoded and is received.

21. An image retrieval method, comprising the steps of:

extracting a plurality of image characteristic values from pieces of input image data to produce a characteristic descriptor for each piece of input image data;

describing each characteristic descriptor as a piece of for-retrieval description data while holding the correspondence of the piece of for-retrieval description data to a space-time structure of the pieces of input image data;

storing each piece of for-retrieval description data with the piece of input image data corresponding to the piece of for-retrieval description data;

analyzing the pieces of stored for-retrieval description data of the pieces of input image data according to a retrieval request sent from a user to extract the characteristic descriptors;

performing a conformity judgment processing according to the extracted characteristic descriptors to obtain a retrieval result; and presenting the retrieval result to the user.

22. An image retrieval method according to claim 21, further comprising the steps of:

preparing pieces of video data as the pieces of input image data;

presenting a piece of key image data, which represents each of pieces of video data specified in the retrieval, to the user as the retrieval result;

receiving a reproduction request indicating a specific key image which is selected by the user from a plurality of key images indicated by the pieces of key image data;

reading out a piece of specific video data represented by the specific key image; and decoding and reproducing the piece of specific video data.

*23. An image characteristic evaluating system, comprising:*

*a characteristic extracting unit for extracting color information of each frame as an image characteristic value for each image frame from image data;*

*a characteristic descriptor producing unit for producing characteristic descriptors for each video segment by arithmetically averaging color information, extracted by the characteristic extracting unit, of each frame per video segment composed of a plurality of image frames of image data;*

*a characteristic description data analyzing unit for inputting a characteristic descriptor file or a characteristic descriptor stream in which color characteristic descriptors extracted by characteristic descriptor producing unit per video segment are sequenced, and for extracting a characteristic descriptor of the specified video segment from the characteristic descriptor file or the color characteristic descriptor stream; and*

*an evaluating unit for evaluating similarity between a required characteristic descriptor and the characteristic descriptor of the specified video segment extracted by the characteristic description data analyzing unit.*

*24. The image characteristic evaluating system according to claim 23, wherein the color information indicates a histogram corresponding to an image frame.*

*25. The image characteristic evaluating system according to claim 23, wherein*

*the color information indicates a spatial distribution of luminance and color differences.*

*26. A method of evaluating image characteristic values, comprising the steps of:*

*extracting color information of each frame as an image characteristic value for each image frame from image data;*

*producing characteristic descriptors for each video segment by arithmetically averaging color information, extracted by the characteristic extracting unit, of each frame per video segment composed of a plurality of image frames of image data;*

*inputting a characteristic descriptor file or a characteristic descriptor stream in which characteristic descriptors extracted in the step of extracting per video segment are sequenced;*

*extracting a color characteristic descriptor for a specified video segment from the color characteristic descriptor file or the color characteristic descriptor stream; and*

*evaluating similarity between a required characteristic descriptor and the characteristic descriptor of the specified video segment extracted in the extracting step.*

*27. The method of evaluating image characteristic according to claim 26, wherein the color information indicates a histogram corresponding to an image frame.*

*28. The method of evaluating image characteristic according to claim 26, wherein*

*the color information indicates a spatial distribution of luminance and color differences.*

* * * * *